United States Patent [19]
Yoshida

[11] Patent Number: 5,560,036
[45] Date of Patent: Sep. 24, 1996

[54] DATA PROCESSING HAVING INCIRCUIT EMULATION FUNCTION

[75] Inventor: Toyohiko Yoshida, Itami, Japan

[73] Assignee: Mitsubishi Denki Kabushiki Kaisha, Tokyo, Japan

[21] Appl. No.: 432,316

[22] Filed: May 1, 1995

Related U.S. Application Data

[63] Continuation of Ser. No. 220,414, Mar. 30, 1994, abandoned, which is a continuation of Ser. No. 624,026, Dec. 7, 1990, abandoned.

[30] Foreign Application Priority Data

Dec. 14, 1989 [JP] Japan ..................... 1-326292

[51] Int. Cl.$^6$ ........................................... G06F 1/00
[52] U.S. Cl. .................. 395/800; 395/375; 395/497.01; 364/231.8; 364/243.2; 364/245.4; 364/260; 364/DIG. 1
[58] Field of Search ...................... 395/800, 425, 395/375, 497.01; 364/231.8, 243.2, 245.4, 260, DIG. 1

[56] References Cited

U.S. PATENT DOCUMENTS

| | | | |
|---|---|---|---|
| 4,674,089 | 6/1987 | Poret et al. | 371/25 |
| 4,783,731 | 11/1988 | Miyazaki et al. | 395/425 |
| 4,799,215 | 1/1989 | Suzuki | 370/60 |
| 4,827,402 | 5/1989 | Wada | 364/200 |
| 4,985,825 | 1/1991 | Webb, Jr. et al. | 395/425 |
| 5,043,870 | 8/1991 | Ditzel et al. | 364/200 |
| 5,056,013 | 10/1991 | Yamamoto | 395/500 |
| 5,091,853 | 2/1992 | Watanabe et al. | 395/375 |
| 5,136,696 | 8/1992 | Beckwith et al. | 395/375 |
| 5,193,205 | 3/1993 | Matsuo | 395/800 |
| 5,287,483 | 2/1994 | Utsumi | 395/425 |

FOREIGN PATENT DOCUMENTS

| | | |
|---|---|---|
| 61-241841 | 10/1986 | Japan . |
| 63-193230 | 8/1988 | Japan . |

Primary Examiner—Alyssa H. Bowler
Assistant Examiner—John Harrity
Attorney, Agent, or Firm—Towsend and Townsend and Crew LLP

[57] ABSTRACT

An improved data processor includes a high-speed memory that functions as a data cache during normal operation and as a trace memory to debug software in an in-circuit emulation mode. A register counts the number of storage location and overflows when a predetermined number is exceeded to cause an exception which transfers information off-chip from the trace memory. In one embodiment a starting address is stored and compared to a program counter of an instruction completely executed in the execution unit to begin the tracing.

23 Claims, 20 Drawing Sheets

Fig. 25

| BAT | ADDRESS PIN | DATA PIN H | DATA PIN L | INSTRUCTION PIN |
|---|---|---|---|---|
| 000 | DATA ADDRESS | DATA H | DATA L | RESERVED |
| 001 | INSTRUCTION ADDRESS | RESERVED | RESERVED | INSTRUCTION CODE |
| 100 | COMMAND | OPERAND H | OPERAND L | RESERVED |
| 101 | COMMAND | RESERVED | PC | RESERVED |
| OTHERS | RESERVED | RESERVED | RESERVED | RESERVED |

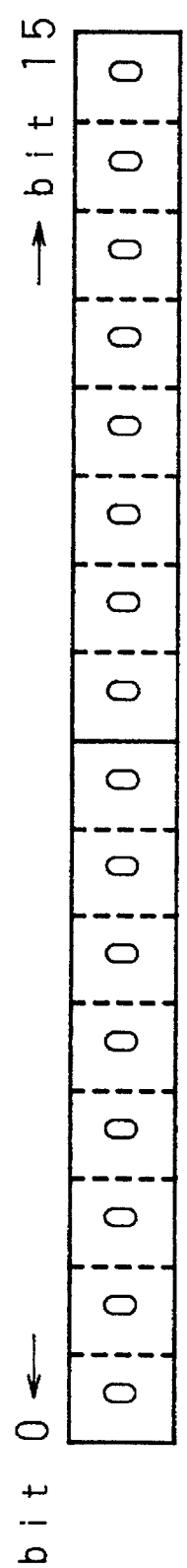
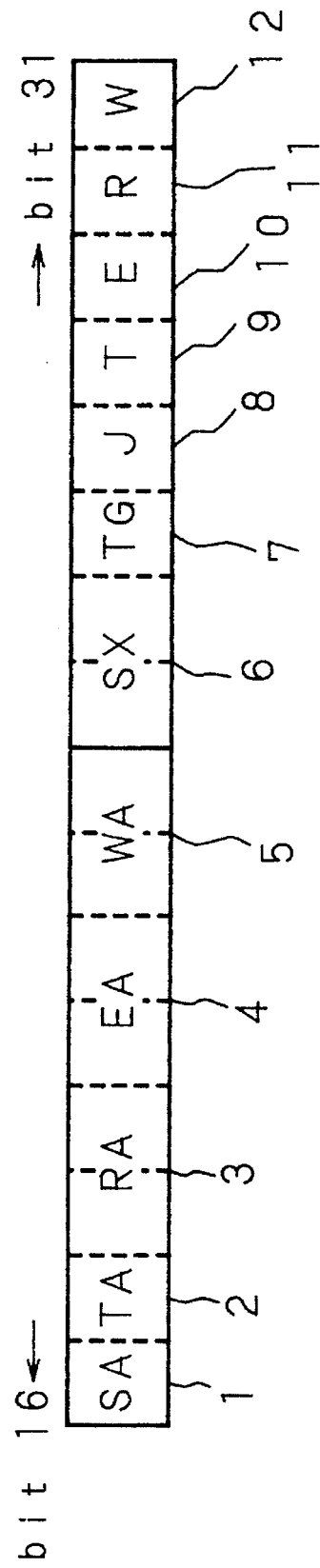
Fig. 27

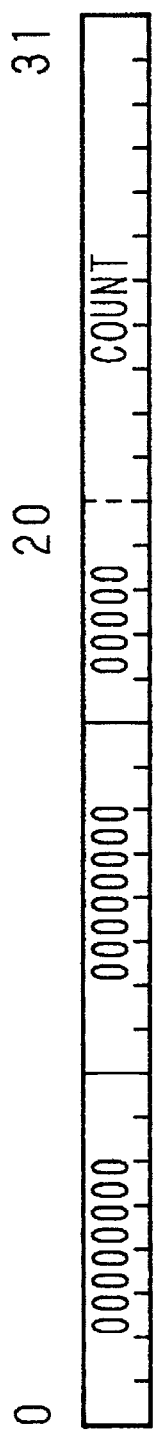
Fig. 28
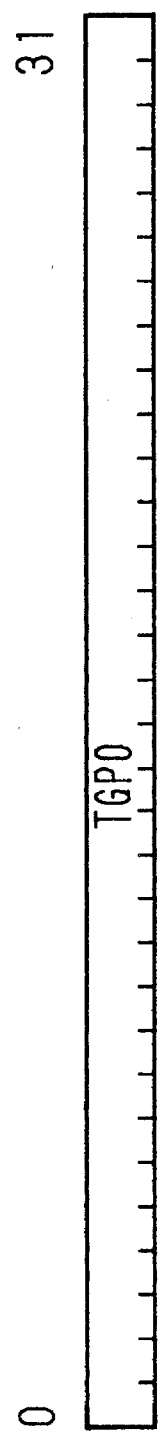
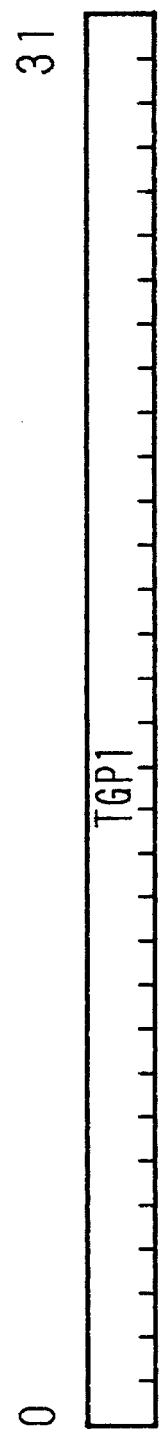
Fig. 29

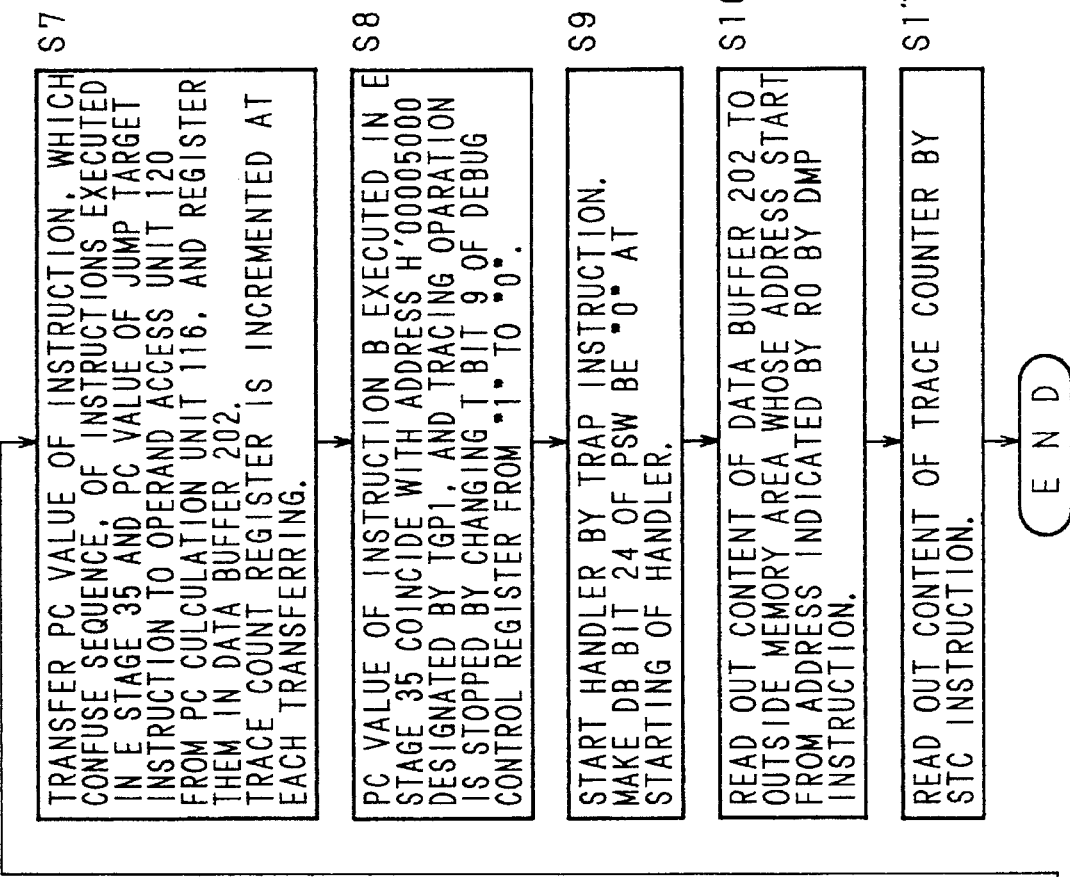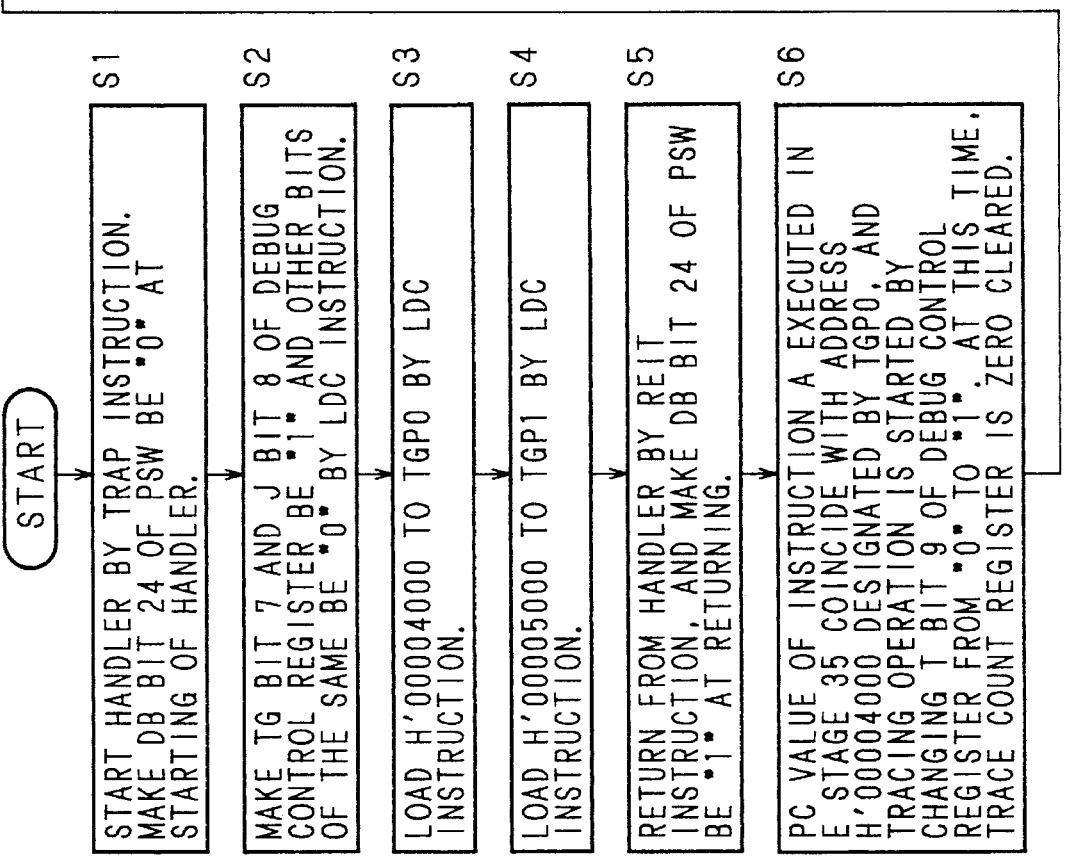
Fig. 34

DATA PROCESSING HAVING INCIRCUIT EMULATION FUNCTION

This is a continuation of application Ser. No. 08/220,414, filed Mar. 30, 1994, now abandoned, which is a continuation of application Ser. No. 07/624,026, filed Dec. 7, 1990, now abandoned.

BACKGROUND OF THE INVENTION

1. Field of the Invention

The present invention relates to a data processor, more particularly, it relates to a data processor having an incircuit emulation function such as a trace memory or a breakpoint register which stores PC values of executed instructions so as to enable debugging of a system easily.

2. Description of Related Art

For debugging a data processing system, the operation of hardware relative to software for operating the system must be observed accurately. For this reason, a technique called an incircuit emulation has been used hitherto.

Though the incircuit emulation is the effective technique for the system debug, since this technique is for observing various data processed by the data processor to analyze the operation, supporting circuits for the incircuit emulation should be operable at higher speed as the operating speed of the system becomes faster, thus its realization is becoming difficult.

Also, in the data processor adopting the pipeline processing, in such case when a jump instruction is executed, fetched instructions are not always executed, thus an operation analysis of the data processor is becoming more and more difficult.

In order to solve these problems, a data processor in which the supporting circuits for the incircuit emulation for the data processor are realized in one integrated circuit has been proposed.

In this data processor, by integrating the incircuit emulation circuit for debugging a microprocessor system in the same integrated circuit as the microprocessor, information necessary for the operation analysis of the microprocessor is made available outside the integrated circuit. Its detailed content is disclosed in, for example, Japanese Patent Application Laid-Open No. 61-241841 (1986).

As the data processor becomes faster the higher operating speed of the memory is required, results in increase of cost related to a memory system. In order to solve this problem, conventionally a technique known as a cache memory has been used. The data processor in which this cache memory is realized in the same integrated circuit as the microprocessor is also disclosed in, for example, Japanese Patent Application Laid-Open No. 63-193230 (1988) in detail.

When realizing the circuits for incircuit emulation in the same integrated circuit as the data processor to take out information necessary for the debug from the integrated circuit, a memory capable of storing the information at high speed outside the integrated circuit is necessitated. When operation speed of the external memory is slower than that of the data processor, storing of debug information outputted from the integrated circuit to the outside is difficult. In the conventional example disclosed in the Japanese Patent Application Laid-Open No. 61-241841 (1986), an output circuit for incircuit emulation and pins for outputting the debug information from the integrated circuit to the outside are provided.

In the microprocessor in which the data processor is realized on one integrated circuit, it is proposed to incorporate a high-speed buffer memory as a data cache. However, in the case where the buffer memory-which occupies a large area in the integrated circuit is used only as the cache, utilization efficiency of the integrated circuit is low. Depending upon applications, there is the case which is less effective even when the internal cache is used, or the case where the internal cache can not be used. Particularly, in order to output many trace information from the integrated circuit by utilizing the incircuit emulation function, it is desirable that the internal cache be not operated. Therefore, in the case where the internal buffer memory has a single function which can only be used in the cache memory, the capacity of the internal buffer memory, in other words, the area occupied in the integrated circuit may not be utilized effectively.

SUMMARY OF THE INVENTION

The present invention has been devised in view of the aforesaid problems, therefore, it is a primary object thereof to provide a data processor, in which an incircuit emulation function is realized by enabling the use of a data buffer in chips, which is used usually as a data cache, as a trace memory storing debug information during debugging.

A first invention of the data processor of the present invention includes an instruction decoding unit for decoding the instruction, an operation unit (instruction execution unit) for executing the instruction, a microprogram ROM unit (control unit) which is connected to the instruction decoding unit and controls the operation unit in response to the output of the instruction decoding unit, a data buffer (storing means) which operates as a data cache or a trace memory for storing debug information by changing over the modes, and a register (buffer memory control register) for holding information designating the data buffer mode. In such first invention, the instruction fetched from a memory is decoded in the instruction decoding unit, and according to control of the microprogram ROM unit into which the decoded result is inputted, the instruction is executed in the operation unit. More specifically, in the case where both a TG bit and a T bit of a debug control register are "0", the data buffer operates as the data cache according to the EM field value of the buffer memory control register, and caches the operand necessary for executing the instruction to the data buffer. In the case where the DB bit of the PSW is "1" and the T bit of the debug control register is "1", the data buffer operates as the trace memory, and stores the program counter (PC) value of the instruction calculated and executed in the PC calculation unit as trace information.

Furthermore, in the first invention, a J bit which controls to store selectively the instruction which disturbs the execution sequence of the instruction and produces a jump, and the program counter value of the jump target instruction in the trace memory is included. In such a configuration, when the data buffer operates as the trace memory, in the case where the J bit of the debug control register is set to "1", only the instruction which disturbs the execution sequence of the program by occurrence of the execution, exception and trap, and the program counter value of the instruction of the jump destination are stored selectively in the trace memory.

In a second invention, a trace counter register which counts the number of program counter values serving as trace information stored by the data buffer operating as the trace memory, and an exception processing mechanism in which exception occurs (debug trap) in the case where the debug information stored in the data buffer overflows are included. In such second invention, when the data buffer operates as the trace memory, the number of program counter values stored is counted by a trace counter, and the debug trap is started when the trace memory overflows.

Meanwhile, a third invention includes a trigger point register for storing the instruction address which starts the operation of the data buffer as the trace memory. In such third invention, when the data buffer operates as the trace memory, the tracing operation is started from the instruction of the program counter value coincided with the program counter value stored in a trigger point register.

The above and further objects and features of the invention will more fully be apparent from the following detailed description with accompanying drawings.

BRIEF DESCRIPTION OF THE DRAWINGS

FIG. 25 is a table showing the meaning of BAT(0:2) signal of a data processor of the present invention, FIG. 27 is a schematic view showing the configuration of a debug control register of the data processor of the present invention, FIG. 28 is a schematic view showing the configuration of the trace count register of the data processor of the present invention, FIG. 29 is a schematic view showing the configuration of the trigger point register of the data processor of the present invention, FIG. 34 is a flow chart showing a first specific example of the tracing operation of the data processor of the present invention.

DETAILED DESCRIPTION OF THE PREFERRED EMBODIMENTS

In the following, the present invention will be particularly described with reference to the drawings showing its embodiments.

(1) "Configuration of a System using a Data Processor of the Present Invention"

Figure 1:
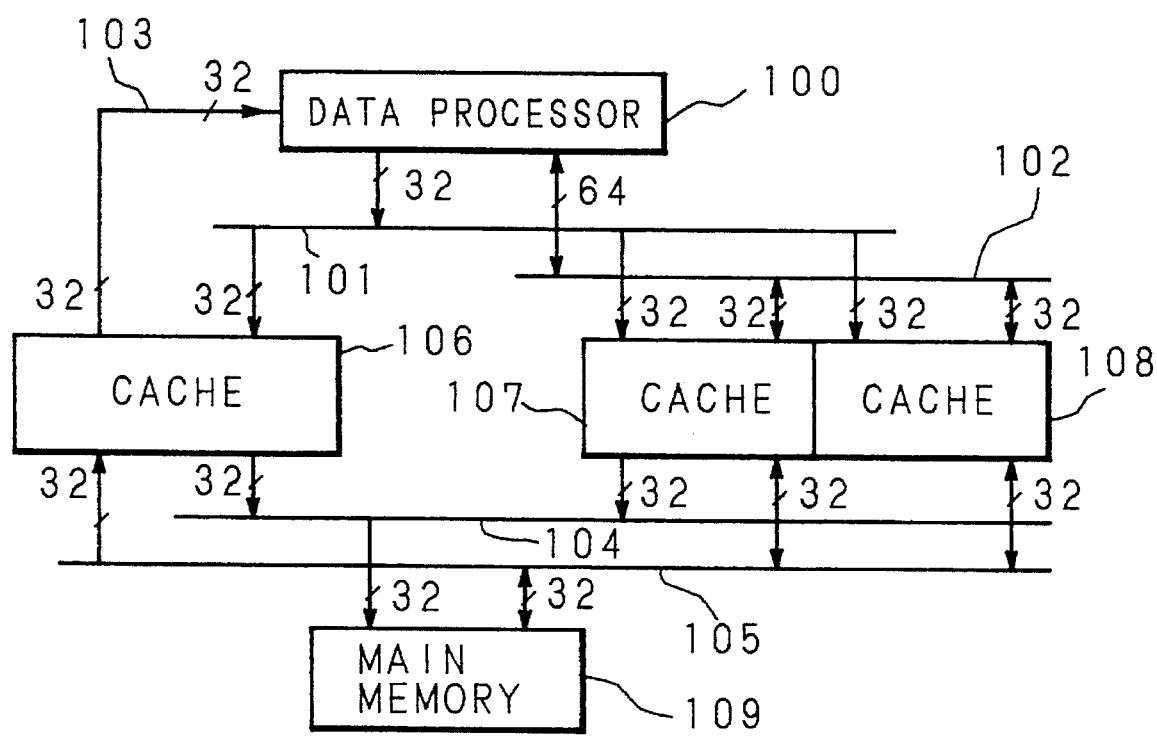
FIG. 1 is a block diagram showing an exemplary configuration of a data processing system using a data processor of the present invention.

FIG. 1 shows a configuration of a system using a data processor of the present invention.

In this configuration, a data processor 100 of the present invention, an instruction cache 106, data caches 107 and 108 and a main memory 109 are connected by an address bus 101, a data bus 102, an instruction bus 103, a memory address bus 104 and a memory data bus 105.

The address bus 101 inputs the address outputted from the data processor 100 of the present invention into the instruction cache 106 and the data caches 107, 108. The instruction bus 103 transfers the instruction code outputted from the instruction cache 106 to the data processor 100 of the present invention. The data bus 102 transfers data outputted from the data processor 100 of the present invention to the data caches 107, 108, or data outputted from the data caches 107, 108 to the data processor 100 of the present invention. The memory address bus 104 transfers the address outputted from the instruction cache 106 or the data caches 107, 108 to the main memory 109. The memory data bus 105 transfers the instruction or data between the main memory 109 and the instruction cache 106 or the data caches 107, 108.

When the instruction cache 106 and the data caches 107, 108 made a miss, the respective cache 106 or 107 arbitrates the bus authority of the memory address bus 104 and the memory data bus 105 to access the main memory 109.

In the data caches 107, 108, on the side of the data processor 100 of the present invention, two chips are operated in cooperation with each other to associate with a 64-bit bus. For each of the 64-bit data, the data cache 107 treats the high-order 32-bit data and the data cache 108 treats the low-order 32-bit data.

In the following, first, an instruction system and a processing mechanism of the data processor 100 of the present invention will be explained, and next, an exception processing method and an operand store operation will be explained in detail.

(2) "Instruction Format of the Data Processor of the Present Invention"

An instruction of a data processor of the present invention is formed on a 16-bit unit basis, being variable in length. No instruction with an odd number of bytes is used herein.

The data processor of the present invention has an instruction format system specifically devised for the purpose of coding highly frequent instructions in a short, format. For example, as to a two-operand instruction, two formats are provided; a general format which has basically a configuration of "four bytes+extension part(s)" and allows the utilization of all addressing modes and a short format allowing only the use of a highly frequent instruction and an addressing mode.

The meanings of symbols appearing in the instruction Format of the data processor of the present invention shown in FIG. 2 to FIG. 6 are as follows:

: Field wherein operation code is put.

Ea: Field for generating an operand in a general type 8-bit addressing mode.

Sh: Field for specifying an operand in a short type 6-bit addressing mode.

Rn: Field for specifying an operand in a register by the register number.

Figure 2:
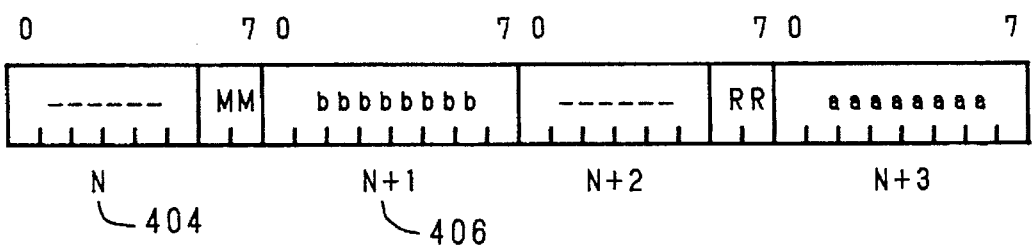
FIG. 2 through FIG. 6 are schematic views showing instruction formats of a data processor of the present invention.

In the format, as shown in FIG. 2, the right side 402 is the LSB side and is high address. The instruction format can be discriminated only after an address N 404 and an address N+1 406 are checked. As described above, this is because of a premise that the instruction is fetched and decoded on a 16-bit (half word) unit basis without fail.

In the data processor of the present invention, in the case with any format, the extension part of Ea or Sh of each operand is sure to be positioned immediately after 16 bits (half word) comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next operation field.

For example, consideration is made on the case of 6-byte instruction which comprises Ea1 in a first half word, Ea2 in a second half word, and ends with a third half word. In the case where the chained addressing mode is used for Ea1, and Ea2 has extension part, the actual instruction bit pattern is composed in the sequence of the first half word of instruction (including the basic part of Ea1), the chained addressing mode of Ea1, the second half word of instruction (including the basic part of Ea2), the extension part of Ea2 and the third half word of instruction.

(2.1) "Short-Format Two-Operand Instruction"

Figure 3:
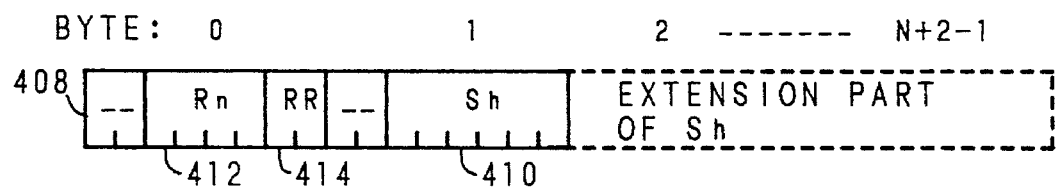

FIG. 3 is a schematic diagram showing short format of the two-operand instruction.

This format includes a L-format wherein the source operand side is a memory and a S-format wherein the destination operand side is a memory.

In the L-format, symbol Sh 410 represents the specifying field of the source operand, symbol Rn 412 represents the specifying field of the register of the destination operand and RR 414 represents specifying of the operand size of Sh 410, respectively. The size of the destination operand located in the register is fixed to 32 bits. Where the size of the resister side differs from that of the memory side and the size of the source side is smaller, sign extension is performed.

In the S-format, symbol Sh 410 represents the specifying field of the destination operand, symbol Rn 412 represents the register specifying field of the source operand and RR 414 represents specifying of the operand size of Sh 410, respectively. The size of the source operand located in the register is fixed to 32 bits. Where the size of the register side differs from that of the memory side and the size of the source side is larger, truncating of the overflow portion and overflow check are performed.

(2.2) "General-Format One-Operand Instruction"

Figure 4:
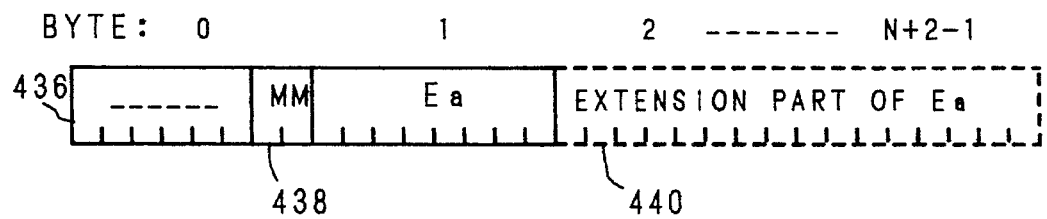

FIG. 4 is a schematic diagram showing a general format 436 of one-operand instruction (G1-format).

Symbol MM 438 represents the specifying field of the operand size. Some of the G1-format instructions comprise an extension part besides the extension part of Ea 440. There are also instructions using no MM 438.

(2.3) "General-Format Two-Operand Instruction"

Figure 5:
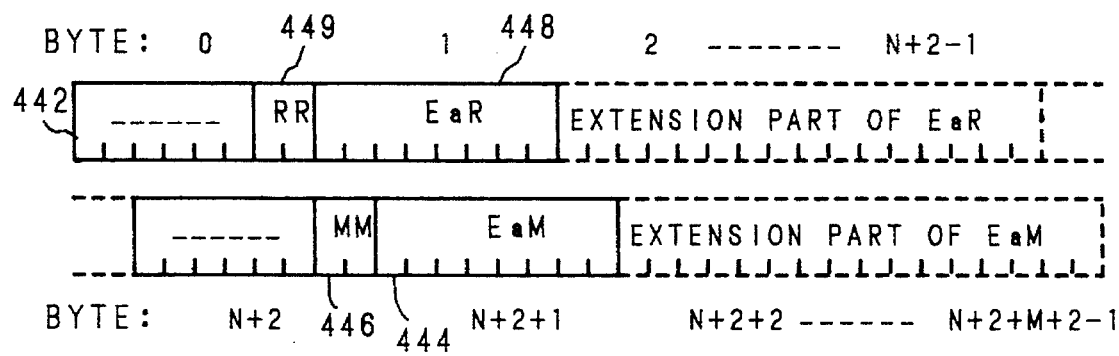

FIG. 5 is a schematic diagram showing general format of two-operand instruction.

This format comprises an instruction having a maximum of two operands of the general-type addressing mode which are specified by eight bits. There are cases where the total number of operands becomes three or more.

Symbol EaM 444 represents the specifying field of the destination operand, symbol MM 446 represents the specifying field of the destination operand size, EaR 448 represents the specifying field of the source operand, and RR 449 represents the specifying field of the source operand size.

Some of the G-format instructions comprise an extension part besides the extension part of EaM 444 and EaR 448.

Figure 6:
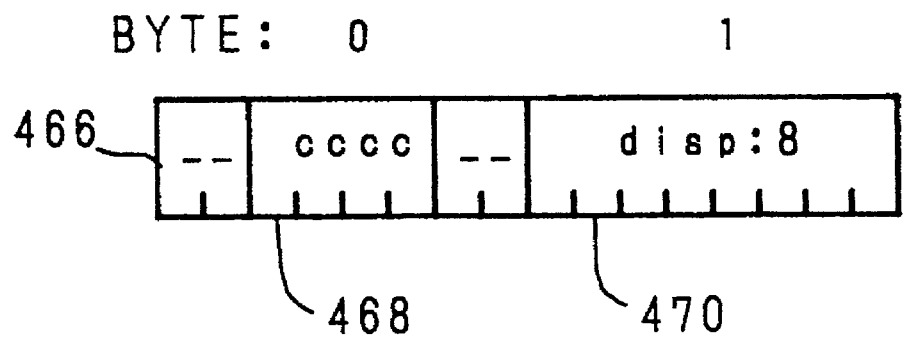

FIG. 6 is a schematic diagram showing a format 466 of a short branch instruction.

Symbol cccc 468 represents the specifying field of a branch condition, symbol disp:8 470 represents the specifying field of displacement to a jump destination, and in the data processor of the present invention, when displacement is specified by eight bits, the displacement value is set by doubling the specified value in the bit pattern.

(2.4) "Addressing Mode"

The methods of specifying the addressing mode of the data processor of the present invention include the short type specified by six bits including the register and the general type specified by eight bits.

Where an undefined addressing mode has been specified, or where a combination of addressing modes obviously unsuitable has been specified, a reserved instruction exception is generated, likewise, the case where the undefined instruction has been executed, and exception processing is started.

Examples of these cases are the case where the destination is the immediate mode and the case where the immediate mode is used in the specifying field of the addressing mode to be accompanied by address calculation.

Meanings of symbols used in the format diagram shown in FIG. 7 to FIG. 10 is as follows:

Rn : Register specifying (Sh) : Designating method by the short-type addressing mode of six bits (Ea) : Designating method by the general-type addressing mode of eight bits In the format diagram, the portion surrounded by a broken line shows the extension part.

(2.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate mode, an absolute mode, a Program Counter (PC) relative indirect mode, a stack pop mode and a stack push mode.

Figure 7:
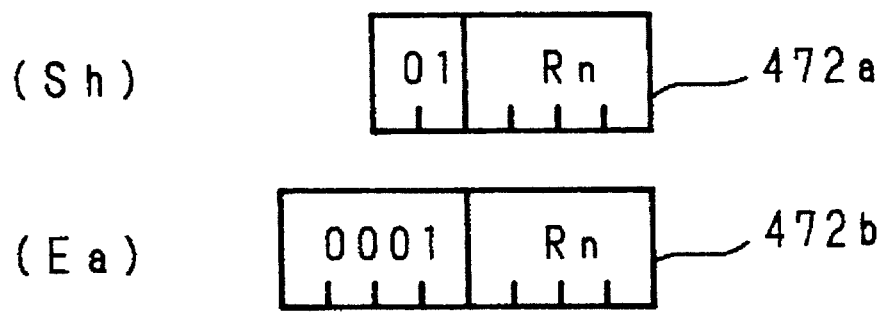
FIG. 7 through FIG. 20 are schematic views showing formats of an addressing mode specifying field in the instruction of the present invention.

The register direct mode takes the content of a register intact as an operand. FIG. 7 is a schematic diagram of the format thereof. Each symbol Rn 472a, 472b shows the number of the general-purpose register.

Figure 8:
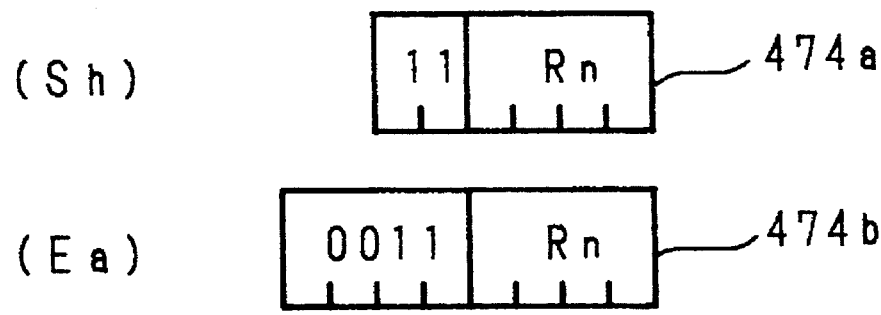

The register indirect mode takes as an operand the content of the memory whose address is the content of a register. FIG. 8 is a schematic diagram of the format thereof. Each symbol Rn 474a, 474b shows the number of the general-purpose register.

Figure 9:
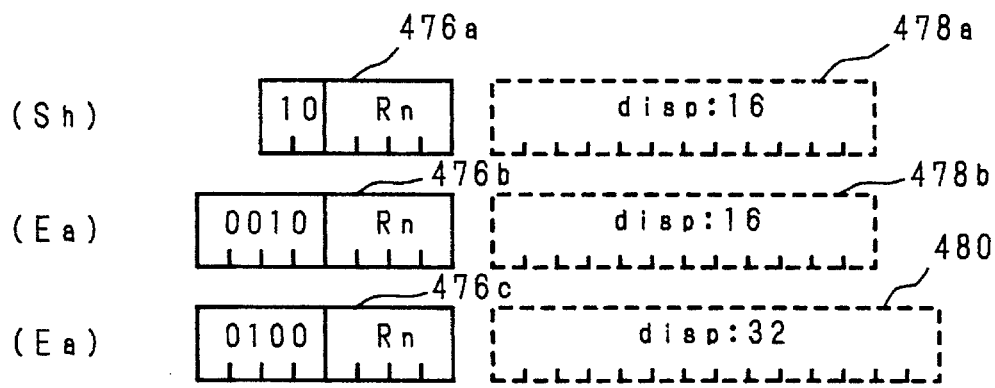

The register relative indirect mode includes two kinds (16 bits and 32 bits) of the displacement value. Each of them takes as an operand the content of the memory whose address is the value of the content of the register added to the displacement value of 16 bits or 32 bits. FIG. 9 is a schematic diagram of the format thereof. Each symbol Rn 476a, 476b, 476c shows the number of the general-purpose register. Each symbol disp:16 478a, 478b and disp:32 480 shows the displacement value of 16 bits and the displacement value of 32 bits, respectively. The displacement value is handled with a signed binary number.

Figure 10:
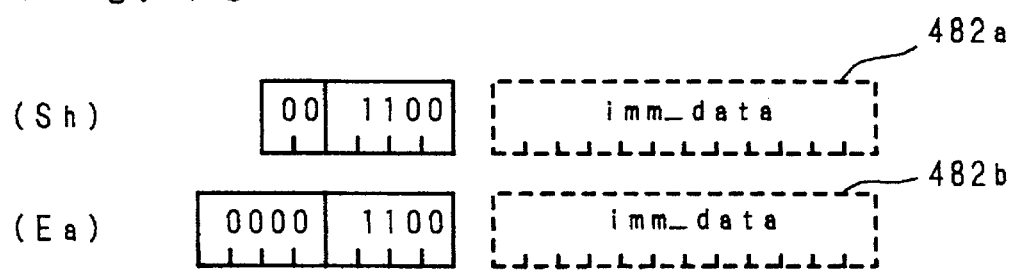

The immediate mode takes as an operand the bit pattern specified in the instruction code while assuming it intact as a binary number. FIG. 10 is a schematic diagram of the format thereof. Each symbol imm_data 482a, 482b shows the immediate. The size of imm_data is specified in the instruction as the operand size.

Figure 11:
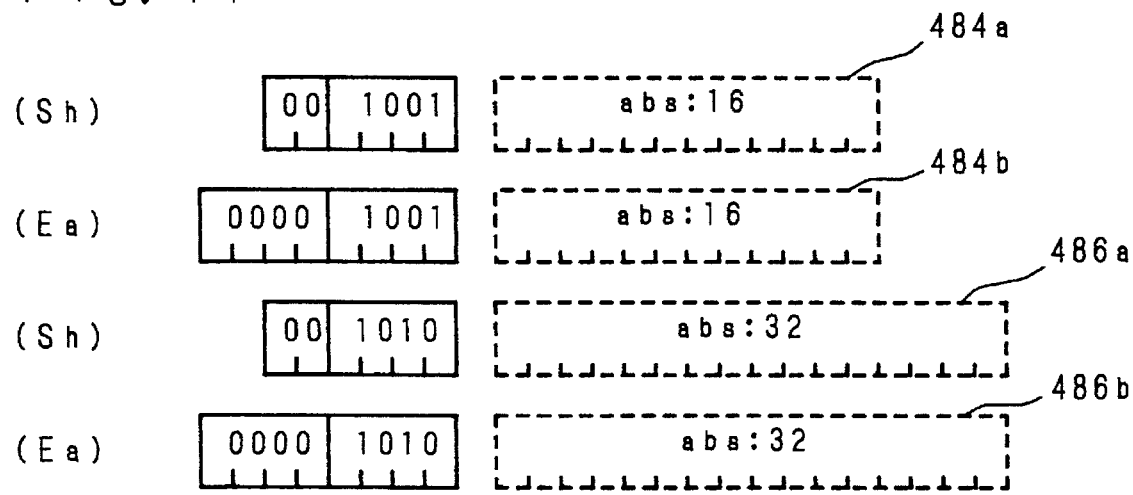

The absolute mode includes two kinds of field (16 bits and 32 bits) for showing the address value. Each kind takes as an operand the content of the memory whose address is the bit pattern of 16 bits or 32 bits specified in the instruction code. FIG. 11 is a schematic diagram showing the format thereof. Each symbol abs:16 484a, 484b and abs:32 486a shows the address value of 16 bits and 32 bits, respectively. When the address is shown by abs:16, the specified address value is sign-extended to 32 bits.

Figure 12:
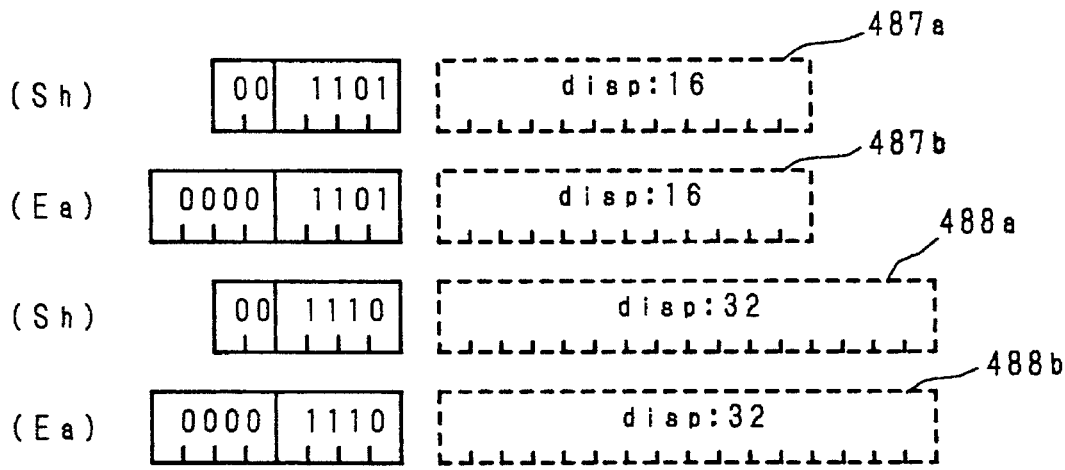

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 12 is a schematic diagram showing the format thereof. Each symbol disp:16 486a, 486b and disp:32 488a, 488b shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

Figure 13:
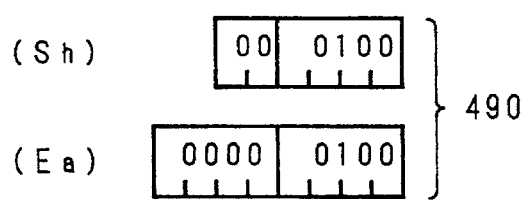

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operands of sizes of 8 bits, 16 bits and 64 bits can also be performed, and the SP is renewed (incremented) by +1, +2 and +8, respectively. FIG. 13 is a schematic diagram of the format thereof. As to the one wherein the stack pop mode is invalid for the operand, a reserved instruction exception is generated. Specifically, the stack pop mode specifying for a write operand and a read-modify-write operand becomes the reserved instruction exception.

Figure 14:
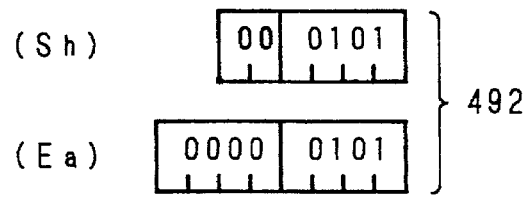

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to specify the stack push mode for operands of sizes of 8 bits, 16 bits and 64 bits, and the SP is renewed (decremented) by −1, −2 and −8, respectively. FIG. 14 is a schematic diagram showing the format thereof. As to the one wherein the stack push mode is invalid for the operand, a reserved instruction exception is generated. Specifically, the stack push mode specifying a read operand and a read-modify-write operand becomes the reserved instruction exceptions.

(2.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When specifying the chained addressing mode, in the basic addressing mode specifying field, one is specified From among three kinds of specifying methods viz. a register base chained addressing mode, a PC base chained addressing mode and an absolute chained addressing mode.

Figure 15:

The register base chained addressing mode is an addressing mode taking the value of register as the base value of the chained addressing to be extended. FIG. 15 is a schematic diagram showing the format 494 thereof. Symbol. Rn 496 shows the number of the general-purpose register.

Figure 16:

The PC base chained addressing mode is an addressing mode taking the value of the program counter (PC) as the base value of the chained addressing to be extended. FIG. 16 is a schematic diagram showing the format 498 thereof.

Figure 17:

The absolute base chained addressing mode is an addressing mode taking zero as the base value of the chained addressing to be extended. FIG. 17 is a schematic diagram of the format 500 thereof.

Figure 18:
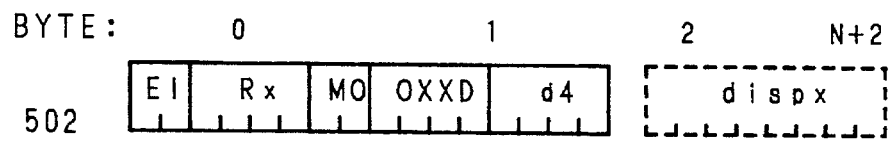

The chained addressing mode specifying field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 18 is a schematic diagram showing the format 502 of the chained addressing mode. Each field has meanings as shown below.

E=0: Chained addressing mode is continued.

E=1: Address calculation ends. tmp ==> address of operand

I=0: No memory indirect reference is performed. tmp+disp+Rx * Scale ==> tmp

I=1: Memory indirect reference is performed. mem [tmp+disp+Rx * Scale] ==> tmp

M=0: <Rx> is used as an index.

M=1: Special index
    <Rx>=0 Index value is not added (Rx=0).
    <Rx>=1 Program counter is used as an index value (Rx=PC).
    <Rx>=2 or more Reserved.

D=0: The value of field d4 of four bits in the chained addressing mode is quadrupled to be taken as a displacement value, and this value is added. The d4 is handled with a signed binary number, and is used by surely quadrupling it irrespective of the size of the operand.

D=1: The dispx (16/32 bits) specified in the extension part of the chained addressing mode is taken as a displacement value, the size of the extension part whereto this value is added is specified in the d4 field.

| | |
|---|---|
| d4 = 0001 | dispx: 16 bits |
| d4 = 0010 | dispx: 32 bits |

XX: Index scale (scale=1/2/4/8)

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 19:
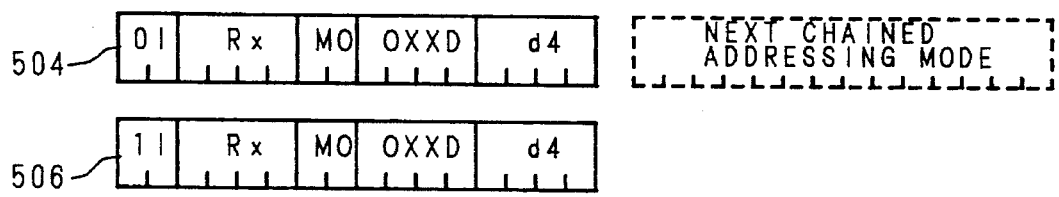
Figure 20:
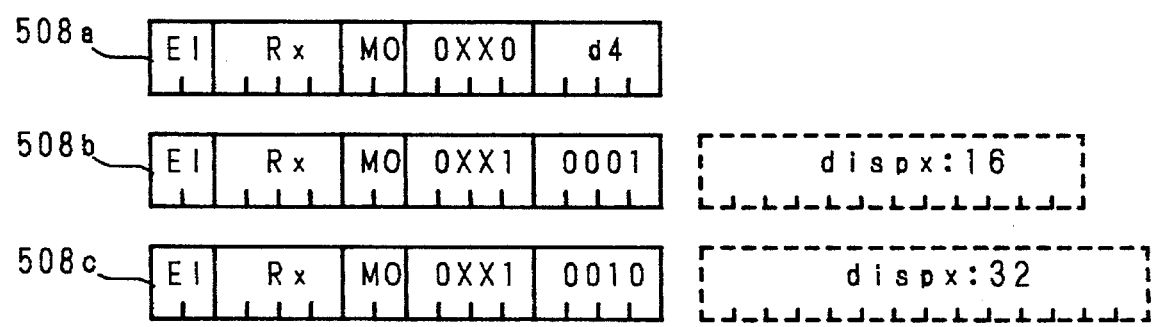

FIGS. 19 and 20 show variations on the instruction format formed by the chained addressing mode.

FIG. 19 shows variations of continuation 504 and completion of the chained addressing mode.

FIG. 20 shows variations 508a, 508b, 508c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(3) "Configuration of Function Block"

Figure 21:
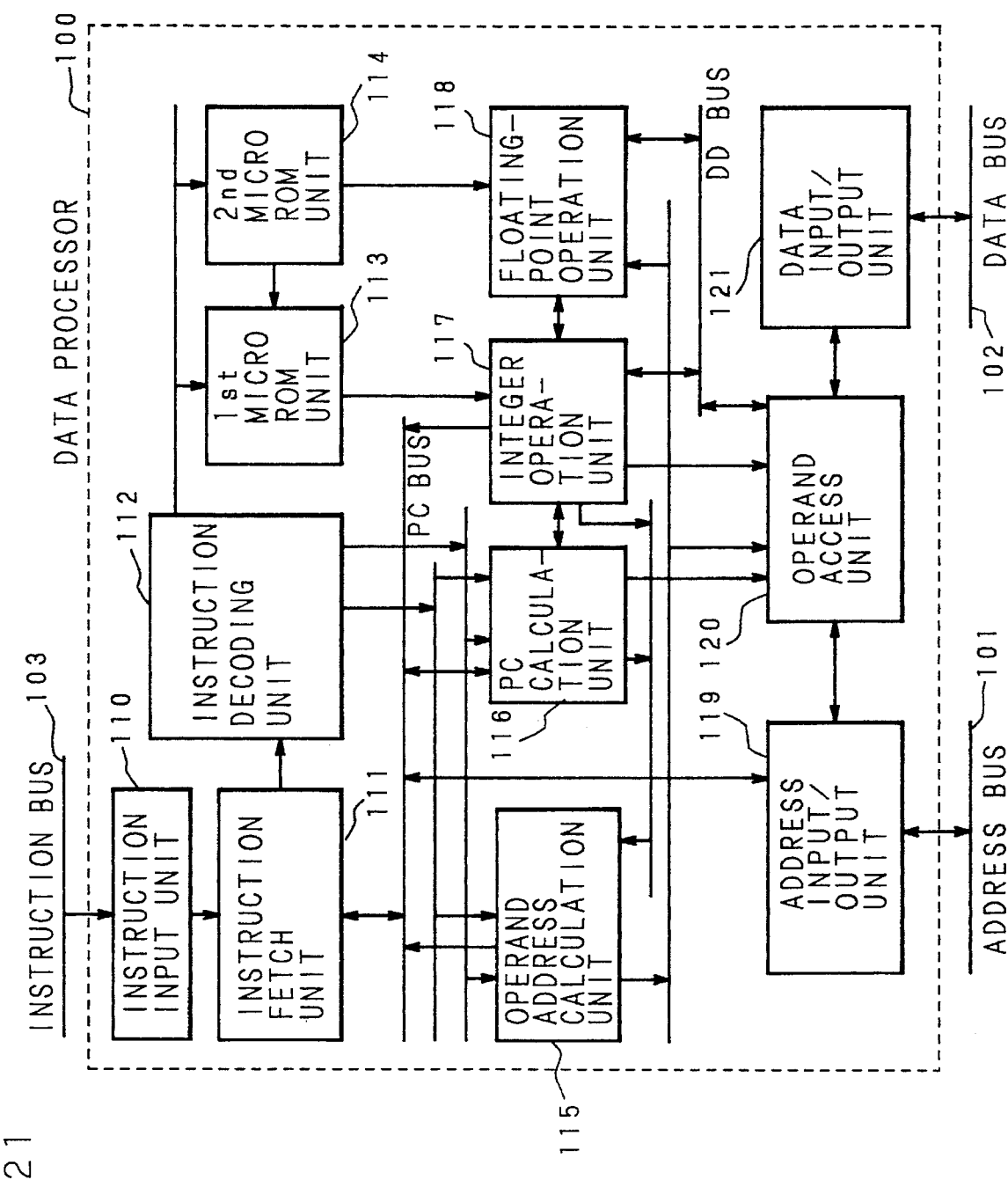
FIG. 21 is a block diagram showing a general configuration of a data processor of the present invention.

FIG. 21 is a block diagram showing a configuration of the data processor of the present invention.

The interior of the data processor of the present invention is functionally divided roughly into an instruction input unit 110, an instruction fetch unit 111, an instruction decoding unit 112, a first micro ROM unit 113, a second micro ROM unit 114, an operand address calculation unit 115, a PC calculation unit 116, an integer operation unit 117, a Floating-point operation unit 118, an address input/output unit 119, an operand access unit 120 and a data input/output unit 121.

The system configuration as abovementioned and shown in FIG. 1 can be realized by connecting the address input/output unit 119 to the address bus 101, the data input/output unit 121 to the data bus, and the instruction input unit 110 to the instruction bus 103.

(3.1) "Instruction Input Unit"

The instruction input unit 110 inputs instruct, ion codes by 32 bits to the data processor of the present invention from the external instruction bus 103.

There are two access modes for the instruction cache 106. One is a standard access mode wherein 32 bits instruction code is accessed with respect to one address. Another is a quad access mode wherein 32 bits instruction code is continuously accessed by four times with respect to one address. In both cases, the instruction input unit 110 outputs the inputted instruction code to the instruction fetch unit 111.

(3.2) "Instruction Fetch Unit"

The instruction fetch unit 111 which comprises an address translation mechanism for an instruction address, a built-in instruction cache, an instruction TLB, an instruction queue and a controlling unit thereof.

The instruction fetch unit 111 translates the PC value of the instruction to be fetched next, fetches the instruction code from the built-in instruction cache, and outputs it to the instruction decoding unit 112. In the case where the built-in instruction cache misses, the instruction fetch unit 111 outputs the physical address to the address input/output unit 119 to request an instruction access for exterior, so that the instruction code inputted through the instruction input unit 110 is registered to the built-in cache.

The PC value of an instruction to be fetched next is calculated by a dedicated counter as the PC value of the instruction to be inputted to an instruction queue. In the case where a jump is generated, a PC value of a new instruction is transferred from the operand address calculation unit 115, PC calculation unit 116 or the integer operation unit 117.

A control circuit inside the instruction fetch unit 111 also executes address translation and updating of the instruction TLB by paging in the case where the instruction TLB makes misses.

Also, in the case where the data processor of the present invention is under the bus watch mode, an entry, which is hit by the physical address inputted through the address input/output unit 109, of the built-in instruction cache is made invalid.

(3.3) "Instruction Decoding Unit"

In the instruction decoding unit 52, basically an instruction code is decoded on a 16-bit (half word) basis. This block comprises a FHW decoder for decoding an operation code included in the first half word, a NFHW (not first half word) decoder for decoding an operation code including in the second and the third half words, and an addressing mode decoder for decoding an addressing mode.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 112 decodes the instruction code being inputted from the instruction fetch unit 111 by 0 bytes through 6 bytes per one clock. Among the results of decoding, information on operation in the integer operation unit 117 is outputted to the first micro ROM unit 113, information on operation in the floating-point operation unit 118 is outputted to the second micro ROM unit 114, information on operand address calculation is outputted to the operand address calculation unit 115, and information on PC calculation is outputted to the PC calculation unit 116, respectively.

(3.4) "First Micro ROM Unit"

The first micro ROM unit 113 comprises a micro ROM for storing microprograms which mainly controls the integer operation unit 117, a microsequencer, and a microinstruction decoder.

A microinstruction is read out from the micro ROM once per one clock. The microsequencer accepts processings of exception, interruption and trap (these three are generally called EIT) in addition to the sequential processings of the microprograms corresponding to each EIT, besides the sequential processing for execution of the microprogram relating to instruction execution.

To the first micro ROM unit 113, there are inputted interruption independent of the instruction code and branch condition of the microprogram by the result of integer operation execution.

Output of the microdecoder is mainly given to the integer operation unit 117, but some information is outputted also to other blocks at execution of jump instruction and acceptance of execution.

(3.5) "Second Micro ROM Unit"

In the second micro ROM unit 114, a micro ROM in which various microprogram routines for controlling a floating-point operation unit 118 are stored, a microsequencer, a microinstruction decoder and so on are included.

The microinstruction is read from the micro ROM once in one clock. The microsequencer also processes the exception related to the floating-point operation besides the sequence processing indicated by the microprogram, and when the Floating point exception not masked is detected, requests the exception processing to the first micro ROM unit 113. The microsequencer of the second micro ROM unit 114 operates in parallel to the microsequencer of the first micro ROM unit 113, and controls the floating-point operation unit 118 in parallel to an integer operation unit 117.

To the second micro ROM unit 114, flag information resulted from the floating-point operation execution is also inputted.

Though output of the microdecoder is mainly outputted to the floating-point operation unit 118, a part of information such as detection of the exception related to the floating-point operation is also outputted to the other functional blocks.

(3.6) "Operand Address Calculation Unit"

The operand address calculation unit 115 is controlled in a hardwired manner by information on operand address calculation outputted from the address decoder of the instruction decoding unit 112 or the like. In this operand address calculation unit 115, operand address calculation other than the memory access for the memory indirect addressing, and jump target address calculation of the jump instruction are executed.

The result of operand address calculation is sent to the integer operation unit 117. In pre-jump processing at the completion of operand address calculation, the result of jump target address calculation is outputted to the instruction fetch unit 111 and the PC calculation unit 116.

An immediate value operand is outputted to the integer operation unit 117 and the floating-point operation unit 118. The values of the general-purpose register and the program counter required for address calculation are inputted from the integer operation unit 117 or the PC calculation unit 116.

(3.7) "PC Calculation Unit"

The PC calculation unit 116 is controlled in a hardwired manner using information on PC calculation outputted from the instruction decoding unit 112. The PC calculation unit 116 calculates the PC value of an instruction.

The data processor of the present invention has a variable-length instruction set, and the length of that instruction can be found only after the instruction is decoded. For this reason, the PC calculation unit 116 generates the PC value of the next instruction by adding the length of the instruction outputted from the instruction decoding unit 112 to the PC value of the instruction in decoding.

Also, in the PC calculation unit 116, comparison of a value of the break point register or trigger point register of the instruction address with the PC value of the executed instruction is executed is executed.

The result of calculation in the PC calculation unit 16 is outputted as the PC value of each instruction together with the result of decoding of the instruction.

In pre-branch processing at the instruction decoding stage, an address of branch destination instruction is calculated by adding a branch width outputted from the instruction decoding unit 11 and the PC value.

Also, the PC calculation unit 116 is provided with a PC stack for holding a copy of PC value, which is push to the stack at executing a jump-to-subroutine-instruction, of return destination from the subroutine. The PC calculation unit 116, for the return-from-subroutine-instruction, executes processing of generating an address of pre-return destination by reading out the return destination PC value from the PC stack.

At the operation of tracing of PC value of executed instruction, the PC calculation unit 116 executes processing of outputting the PC value of the instruction to the operand access unit 120.

(3.8) "Integer Operation Unit"

The integer operation unit 117 is controlled by the microprogram stored in a micro ROM of the first micro ROM unit 113, and executes operations necessary for realizing the function of each integer operation instruction, using the register file and arithmetic unit in the integer operation unit 117.

In the register file, a general register and a working register are included. In the integer operation unit 117, a flag which is varied by the result of integer operation and processor status word (PSW) including the bits which decide the external interruption mask level and the debug environment, and moreover the debug control register and the buffer memory control register are included.

When an operand to be calculated by an instruction is an address or an immediate value, the immediate value or calculated address is inputted from the operand address calculation unit 115. Also, when an operand to be calculated by an instruction is data on the memory, the address calculated in the address calculation unit 115 is outputted to the operand access unit 120, and the operand fetched from the data buffer or the outside is inputted to the integer operation unit 117.

In operation, in the case where the data buffer, external data caches 107, 108 or the main memory 109 must be read, the integer operation unit 117 outputs the address to the operand access unit 120 and fetches target data by direction of the microprogram.

When it is necessary to store the operation result in the data buffer, external data caches 107, 108 or the main memory 109, the integer operation unit 117 outputs the address and data to the operand access unit 120 under the control of the microprogram. At this time, from the PC calculation unit 116, the PC value of the instruction executing the storing operation is outputted to the operand access unit 120.

When external interruption and exception are processed and the integer operation unit 117 receives the new instruction address, the integer operation unit 117 outputs the new instruction address to the instruction fetch unit 111 and the PC calculation unit 116.

(3.9) "Floating Point Operation Unit"

The floating-point operation unit 118 is controlled by the microprogram stored in a micro ROM of the second micro ROM unit 114, and executes operations necessary for realizing the function of each floating-point operation instruction, using the register file and operation device in the Floating-point operation unit 118.

Also, the floating-point operation unit is provided with a floating-point operation mode control register FMC which set a mode of the rounding method of flowing-point operation and detection allowance of floating-point operation exception.

When an operand to be calculated by an instruction is an immediate value, the immediate value is inputted to the floating-point operation unit 118 from the operand address calculation unit 115. When an operand to be calculated by an instruction is data on the memory, the address calculated in the address calculation unit 115 is outputted to the operand access unit 120, and the operand fetched from the data buffer or the outside is inputted to the floating-point operation unit 118.

When it is necessary to store the operand in the data buffer, external data caches 107, 108 or the main memory 109, the floating-point operation unit 118 outputs data to the operand access unit 120 under the control of the microprogram. In storing operation, the floating-point operation unit 118 and the integer operation unit 117 operate in corporation with each other to output the operand itself address from the integer operation unit 117, and the operand From the floating-point operation unit 118 to the operand access unit 120. At this time, from the PC calculation unit 116, the PC value of the instruction executing the storing operation is outputted to the operand access unit 120.

(3.10) "Operand Access Unit"

An operand access unit 120 includes the operand address translation mechanism, the data buffer, a data TLB, a store buffer and an operand breakpoint register and their control units.

The data buffer operates as an internal data cache or a trace memory of the PC value by changing over the modes.

In the case where the data buffer is made to be operated as the internal data cache, when loading data, the operand access unit 120 translates the logical address of data to be loaded outputted from the operand address calculation unit 115 or the integer operation unit 117 into the physical address, fetches data from the data buffer and outputs it to the integer operation unit 117 or the floating-point operation unit 118.

When the data buffer miss occurs, the operand access unit 120 outputs the physical address to the address input/output unit 119, requests the data access to the outside and registers data inputted through the data input/output unit 121 in the data buffer.

When storing the data, the operand access unit 120 translates the logical address of data to be stored outputted from the integer operation unit 117 into the physical address, stores data outputted from the integer operation unit 117 or the floating-point operation unit 118 in the data buffer, outputs the physical address to the address input/output unit 119 through the store buffer and outputs the data to the outside through the data input/output unit 121. When a miss occurs in the storing operation, data is not updated.

In the store buffer, data to be stored and its address, and more over, the PC value of the instruction executing the storing operation are managed in a set. The storing operation in the store buffer is managed in a first-in first-out (FIFO) manner.

When the data buffer is made to be operated as the trace memory, in the operand access operation other than the DMP instruction which damps the content of the trace memory, accessing of the data buffer is not performed. The data buffer operates as a memory holding the PC values of the execution instructions transferred from the PC calculation unit 116 sequentially.

Address translation due to paging when the data TLB miss occurs and the update of the data TLB are also performed by the control circuit in the operand access unit 120. It is also checked whether or not the memory access address is in an I/O region mapped in the memory.

When the data buffer is made to be operated as the internal data cache, in the case where the data processor of the present invention is under a bus watching mode, the operand access unit 120 invalidates the entry of the data buffer hit by the physical address inputted through the address input/output unit 119.

(3.11) "Address Input/Output Unit"

The address input/output unit 119 outputs the address outputted from the instruction fetch unit 111 and the operand access unit 120 to the outside of the data processor 100 of the present invention.

The address is outputted in accordances with a bus protocol defined in the data processor 100 of the present invention.

The bus protocol is controlled by an external bus control circuit in the address input/output unit 119. In the external bus control, the page fault exception, bus access exception and external interruption are also received.

When external device other than the data processor 100 of the present invention is a bus master and the data processor 100 of the present invention is under the bus watching mode, the address input/output unit 119 fetches the address outputted on the address bus 101 when the external device executes the data write cycle, and transfers to the instruction fetch unit 111 and the operand access unit 120.

(3.12) "Data Input/Output Unit"

The data input/output unit 121, at operand loading operation, fetches data from the data bus 102 and transfers it to the operand access unit 120, and at operand storing operation, outputs the operand outputted from the operand access unit 120 to the data bus 102.

As the accessing method of the data caches 107, 108, there are a standard access mode in which 64-bit data are accessed for one address, and a quad accessing mode in which 64-bit data are accessed continuously four times for one address, in either case, the data input/output unit 121 inputs and outputs the data exchanged between the operand access unit 120 and the external memory.

(4) "Pipeline Processing"

The data processor 100 of the present invention performs the pipeline processing of the instruction and operates very efficiently, by effective accessing of the memory using various buffer memories, the instruction bus 103 and the data bus 102.

Here, a pipeline processing method of the data processor 100 of the present invention will be described.

(4.1) "Pipeline Mechanism"

Figure 22:
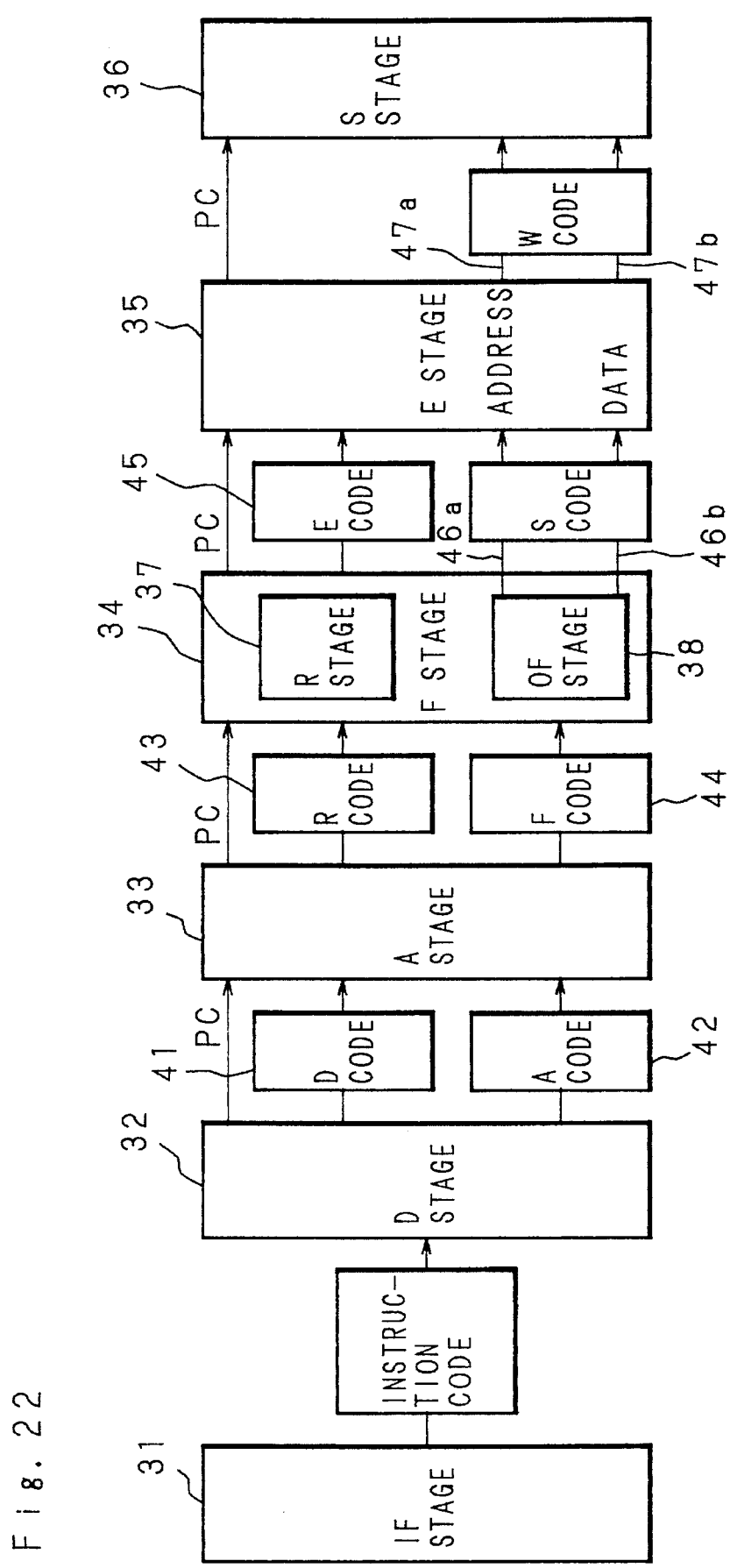
FIG. 22 is a schematic view for explaining a pipeline processing stage of a data processor of the present invention.

A pipeline processing mechanism of the data processor 100 of the present invention is constituted as shown schematically in FIG. 22.

The pipeline processing is executed in six-stage configuration of an instruction fetch stage (IF stage) 31 which prefetches instructions, a decoding stage (D stage) 32 for decoding the instruction, an operand address calculation stage (A stage) 33 which performs address calculation of the operand, an operand fetch stage (F stage) 34 which performs the micro ROM access (particularly referred to as an g stage 37) and the operand prefetch (particularly referred to as an OF stage 38), an execution stage (E stage) 35 for executing the instruction and a store stage (S stage) 36 which stores the memory operand.

In the S stage 36, there are 3-stage store buffer.

Each stage operates independently of the other stages and, theoretically, the six stages operate completely independently.

Each stage other than the S stage 36 performs one processing in one clock at a minimum. The S stage 36 performs one operand storing in two clock at a minimum. Thus, in the case where there is no memory operand storing, theoretically, the pipeline processing is proceeded sequentially in every one clock.

In the data processor of the present invention, though there is the instruction which can not be processed by only one basic pipeline processing such as the memory-memory operation or the memory indirect addressing, it is so constituted that the balanced pipeline processing be also performed for these processings if possible.

For the instruction having a plural number of memory operands, the pipeline processing is performed by decomposing into plural pipeline processing units (step code) in the decoding stage in response to the number of memory operands.

Information given to the D stage 32 from the IF stage 31 is the instruction code itself.

Information given to the A stage 33 from the D stage 32 are, a code (referred to as a D code 41) related to the operation specified by the instruction, a code (referred to as an A code 42) related the operand address calculation and a program counter value (PC) of the instruction being processed.

Information given to the F stage 34 from the A stage 33 are, an R code 43 including the entry address of the micro-program routine and parameters to the microprogram, an F code 44 including the operand address and accessing indicating information, and the program counter (PC) value of the instruction being processed.

Information given to the E stage 35 from the F stage 34 are, an E code 45 including operation control information and literal, S codes (46a, 46b) including the operand and operator address and the PC value of the instruction being processed.

The S codes 46a, 46b comprise an address 46a and data 46b.

Information given to the S stage 36 from the E stage 35 are W codes 47a, 47b which are the operation results to be stored and the PC value of the instruction outputting the operation results.

The W codes 47a, 47b comprise an address 47a and data 47b.

In addition, during the tracing operation, the PC value of the executed instruction is given from the E stage 35 to the S stage 36 without respect to an operand store.

An EIT detected in the stages before the E stage 35 does not start EIT processing until the code thereof reaches the E stage 35. It is because that, only the instruction processed in the E stage 35 is the instruction in the execution step, and the instruction processed in the IF stage 31 through F stage 34 is still not in the execution step. Accordingly, detection of the EIT before the E stage 35 is registered in the step code and just transmitted to the next stage.

The EIT detected in the S stage 36 is received at the time point where execution of the instruction being processed in the E stage 35 is completed or at cancellation of the processing of the instruction, and returned to the E stage 35 for processing.

(4.2) "Processings in Each Pipeline Stage"

The input/output step codes to respective pipeline stages are named, as shown in FIG. 21, for the sake of convenience. In the step codes, there are two kinds, the one which becomes the parameter for the micro ROM entry address and the E stage 35 by performing the processing related to the operation code, and the other which becomes the operand to be processed in the E stage 35.

Between the D stage 32 and the S stage 36, the PC value of the instruction being processed is received and given.

(4.2.1) "Instruction Fetch Stage"

In the instruction fetch stage (IF stage) 31, the instruction fetch unit 111 is operated.

The instruction fetch unit 111 fetches the instruction from the built-in instruction cache or the outside and inputs to an instruction queue, and outputs the instruction code to the D stage 32 in a unit of 2 to 6 bytes. Input of instructions to the instruction queue is performed in a unit of aligned 4 bytes.

When the instruction fetch unit 111 fetches the instruction from the outside under a standard access mode, it requires at least 2 clocks for the aligned 4 bytes.

Under a quad access mode, at least 5 clocks are necessary for 16 bytes.

When the built-in instruction cache is hit, fetch is possible in 1 clock for the aligned 8 bytes.

Output unit of the instruction queue is variable by every 2 bytes, and can be outputted to 6 bytes in 1 clock at a maximum. Right after the jump, the instruction queue may be bypassed and the two bytes of instruction base part is transferred directly to the instruction decoder.

Translation of the logical address of the instruction into the physical address, control of the built-in instruction cache and instruction TLB, management of the prefetch destination instruction address or control of the instruction queue are performed in the IF stage 31.

(4.2.2) "Instruction Decoding Stage"

The instruction decoding stage (D stage) 32 decodes the instruction code inputted from the IF stage 31.

The instruction code is decoded once in one clock using an FHW decoder, and NFHW decoder and an addressing mode decoder in the instruction decoding unit 112, and 0 to 6-byte instruction code is consumed in one decoding (the instruction code is not consumed in the output processing of the step code including the return destination address of the return-from-subroutine-instruction).

In one decoding, an A code 42 as address calculation information and a D code 41 as an intermediate decoding result of the operation code are outputted to the A stage 33.

In the D stage 32, control of the PC calculation unit 116 of each instruction and the output processing of the instruction code from the instruction queue are performed.

In the D stage 32, pre-jump processing is performed for the branch instruction or return-from-subroutine-instruction. For the unconditional branch instruction which made pre-jumping, the D code 41 and A code 42 are not outputted and the instruction processing is completed in the D stage 32.

(4.2.3) "Operand Address Calculation Stage"

Processing of an operand address calculation stage (A stage) 33 is roughly divided into two.

One is the second-stage decoding processing of the operation code using the second decoder of the instruction decoding unit 112, and the other one is the calculation processing of the operand address in the operand address calculation unit 54.

In the post-stage decoding processing of the operation code, the D code 41 is inputted and the g code 43 including the entry address of the write reservation of the register and memory and the microprogram routine and parameters for the microprogram is outputted.

Incidentally, the write reservation of the register and memory is for preventing, when the content of the register or the memory referred at address calculation is rewritten by the preceding instruction in the pipeline, the wrong address calculation.

In the operand address calculation processing, the A code 42 is inputted and in accordance with the A code 42, the operand address is calculated in the operand address calculation unit 54 to output the calculation result as the F code 44.

For the jump instruction, the jump destination address is calculated and the pre-jump processing is executed. At this time, the write reservation is checked when the register is read in connection with the address calculation, and when the preceding instruction has been indicated that there is the reservation because the writing processing for the register or memory is not completed, the preceding instruction is in the waiting state until the writing processing is completed in the E stage 35.

In the A stage 33, for the jump instruction which has not pre-jumped in the D stage 32, the pre-jump processing is performed.

For a jump to the absolute value address or a jump of the register indirect addressing, pre-jumping is performed in the A stage 33. For the unconditional jump instruction performing the pre-jumping, the R code 43 and F code 44 are not outputted and the instruction processing is completed in the A stage 33.

(4.2.4) "Micro ROM Access Stage"

Processing of an operand fetch stage (F stage) 34 is also divided roughly into two.

One is the access processing of the micro ROM, particularly referred to as an R stage 37, and the other one is the operand prefetch processing, particularly referred to as an OF stage 38.

The R stage 37 and the OF stage 38 do not necessarily operate simultaneously, the operation timing being different from each other depending upon miss and hit of the data cache, and miss and hit of data TLB.

The micro ROM access processing which is the processing in the R stage 37 is the micro ROM access and the microinstruction decode processing for generating the E code which is the execution control code used in execution in the next E stage 35 for the R code 43.

In the case where one processing for the R code is decomposed into two or more microprogram steps, there may be the case where the first micro ROM unit 113 and the second micro ROM unit 114 are used in the E stage 35 and the next code 43 is in the waiting state of micro ROM access.

Micro ROM access for the R code 43 is performed when it is not performed in the E stage 35.

In the data processor 100 of the present invention, since a number of integer operation instructions are executed in one microprogram step and many floating-point operation instructions are executed in two microprogram steps, in practice, there is a high frequency of performing the micro ROM access sequentially for the R code 43.

(4.2.5) "Operand Fetch Stage"

The operand fetch stage (OF stage) 38 executes the operand prefetch processing of the aforesaid two processings in the F stage 34.

In the operand fetch stage 38, the logical address of the F code 44 is translated into the physical address by data TLB, and by the physical address, the built-in data cache is accessed to fetch the operand, which is combined with the logical address transferred as the F code 44 and outputted as the S codes 46a, 46b.

In one F code 44, though an 8-byte boundary may be crossed, the operand fetch less than 8 bytes is selected.

In the F code 44, selection whether or not to access the operand is involved, and when the operand address itself or the immediate value calculated in the A stage 33 is transferred to the E stage 35, the operand prefetch is not performed and the content of F code 44 is transferred as the S codes 46a, 46b.

In the case where the operand to be prefetched and the operand to be written by the E stage 35 are coincided, the operand prefetch is not performed from the built-in data cache but through the by-path.

(4.2.6) "Execution Stage"

The execution stage (E stage) 35 operates with the E code 45 and the S codes 46a, 46b as inputs.

The E stage 35 is the instruction executing stage, thus the processings performed in stages before and in the F stage 34 are all pre-processings for the E stage 35.

When a jump is performed or the EIT processing is started in the E stage 35, the processings from the IF stage 31 to the F stage 34 are all repealed.

The E stage 35 is controlled by the microprogram and executes the instruction by executing a series of instructions from the entry address of the microprogram routine indicated in the R code 45.

In the E code 45, there are a code (particularly referred to as an EI code) which controls the integer operation unit 117, and a code (particularly referred to as an EF code) which controls the floating-point operation unit 118. The EI code and EF code are able to output independently, and at this time, in the E stage 35, the integer operation unit 117 and the floating-point operation unit 118 operate in parallel.

For example, when executing the floating-point instruction having no memory operand in the floating-point operation unit 118, this operation is executed in parallel to the operation of the integer operation unit 117.

In both the integer operation and the floating-point operation, read-out of the micro ROM and execution of the microinstruction is executed in the pipeline processing. Accordingly, when the branch occurs in the microprogram, there is a space of one microstep.

In the E stage 35, the write reservation for the register or memory performed in the A stage 33 is released after writing the operand.

Various interruptions are received directly in the E stage 35 at an interval of instructions, and the necessary processing is executed by the microprogram. The other various EIT processings are also performed in the E stage 35 by the microprogram.

When the operation result must be stored in the memory, the E stage 35 outputs the W codes 47a, 47b and the program counter value of the instruction performing the storing processing to the S stage 36.

In addition, during the tracing operation, a PC value of an executed instruction is outputted from the E stage 35 to the S stage 36 with respect with no relation to the store operation of an operand.

(4.2.7) "Operand Store Stage"

The operand store stage 36 translates the logical address 47a of the W code into the physical address by data TLB, and stores the data 47b of the W code in the data buffer by above translated address. Simultaneously, the operand store stage 36 inputs the W codes 47a, 47b and the program counter value in the store buffer, and processes to store the data 47b of the W code in the external memory using t, he physical address outputted from the data TLB.

Also, during the tracing operation, the operand store stage 36 stores PC values which are transferred from the E stage 35 in the data buffer.

The operation of the operand store stage 36 is performed in the operand access unit 120, and also the address translation processing and the permuting processing of the data buffer, in the case where the data TLB or the data buffer miss occurred.

When the operand sore stage 36 detects an EIT at the store processing of the operand, while holding the W codes 47a, 47b and the program counter value in the store buffer, the EIT is noticed to the E stage 35.

(4.3) "State control of Each Pipeline Stage"

Each pipeline stage includes an input latch and an output latch, and basically, operates independently of the other stages.

Each of the stages, when the processing performed one before is completed, transfers the processing result to the input latch in the next stage from the own output latch, and starts the next processing when all of the input signals necessary for the next processing are ready in the input latch of the own stage.

That is, each stage starts the next processing when all of the input signals for the next processing outputted from the preceding stage become effective, and the processing result at that time point is transferred to the input latch of the later stage, and the output latch becomes empty.

All input signals must be ready at the timing immediately before each of the stages starts the operation. In the case where the input signals are not ready, this stage becomes the waiting state (input waiting).

When transferring from the output latch to the input latch of the next stage, the input latch of the next stage must be empty. Even in the case where the next stage input latch is not empty, the pipeline stage is in the waiting state (input waiting).

When the cache or the TLB made a miss or data interference occurs between the instructions being processed in the pipeline, a plural number of clocks are necessitated for the processing of one stage, results in delay of the pipeline processing.

(5) "Detailed Description of Operation of Operand Access Unit"

(5.1) "Configuration of Operand Access Unit"

Figure 23:
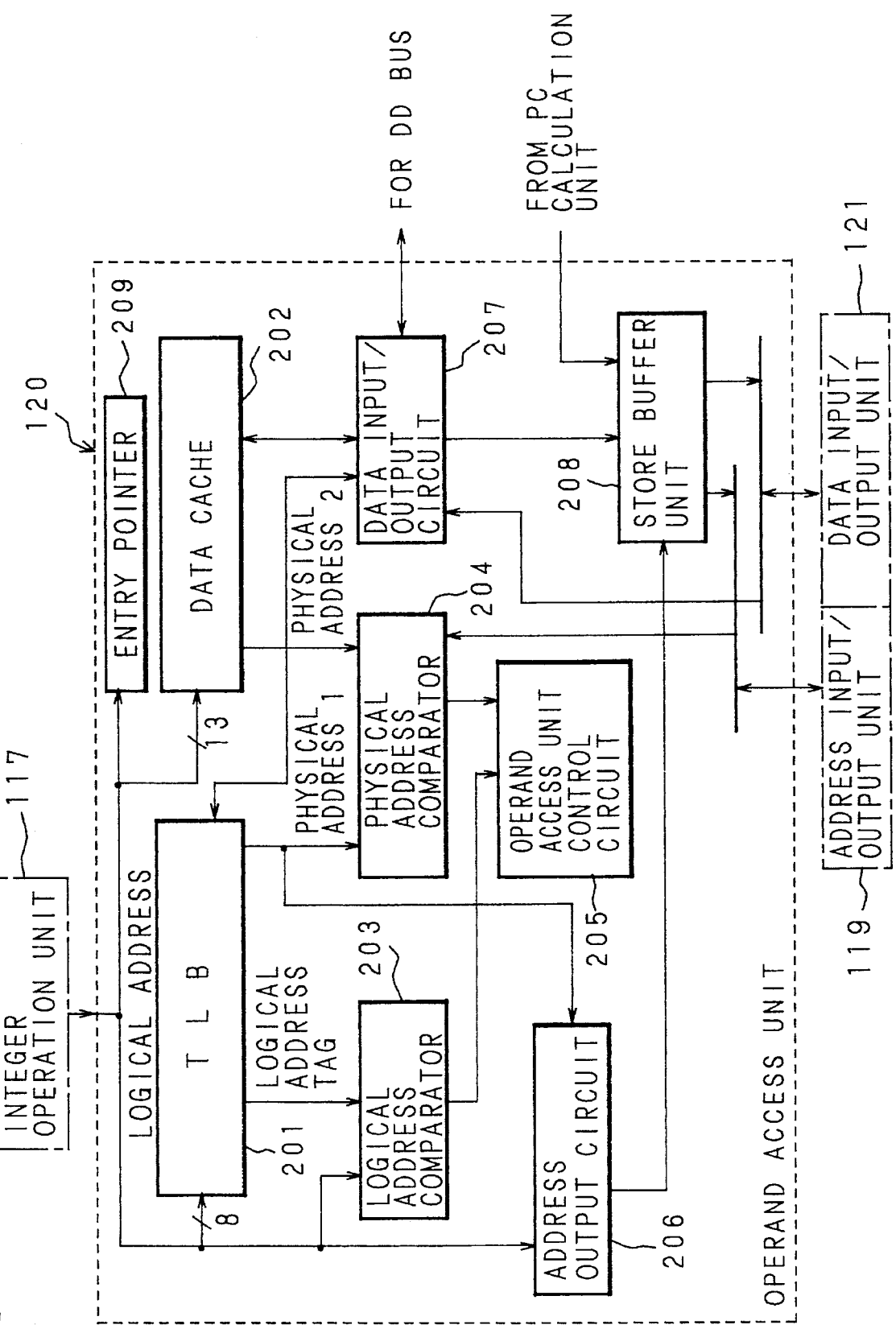
FIG. 23 is a block diagram showing a detailed configuration of an operand access unit of a data processor of the present invention.

A detailed block diagram of an operand access unit 120 is shown in FIG. 23.

The operand access unit 120 is constituted by the TLB 201 in which the logical address and the physical address of data are buffered in a pair, the data buff 202 which operates as the built-in data cache for buffering the physical address and data are buffered in a pair or as the trace memory for storing PC values of executed instructions, a logical address comparator 203 which compares the high-order logical address of accessed data and the logical address tag of the TLB 201, a physical address comparator 204 which compares the physical address outputted from the TLB 201 and the physical address tag outputted from the data buffer 202, a data input/output circuit 207, an address output circuit 206, a store buffer unit 208 and further, an operand access unit control circuit 205 which controls the whole unit in accordance with the comparison results of the logical address comparator 203 and the physical address comparator 204.

In addition, the operand access unit 120 is provided with an entry pointer 209 which indicates an address of entry accessed by the data buffer 202 in the case where the data buffer 202 operates as the trace memory.

The address output circuit 206 is provided with an operand break pointer. The operand break pointer checks whether operand access hits break point or not.

(5.2) "Data Read Operation of Operand Access Unit"

Entry of the TLB 201 is specified by the low-order 8 bits in the high-order 20 bits which are subjected to the address translation in the logical address outputted from the integer operation unit 117.

From the specified entry of the TLB 201, the logical address tag (12 bits) and the physical address (20 bits) are outputted. At this time, when the high-order 12 bits of the logical address and the logical address tag are coincided, it is regarded that the TLB 201 has hit, thus the physical address outputted from the TLB 201 is effective.

Also, in the case where the data buffer 202 operates as the built-in data cache, the entry of the data buffer 202 is specified by the low-order bits (12 bits) which indicate the page offset in the logical address and are not translated into the physical address. From the specified entry of the data buffer 202, the physical address tag (20 bits) and data are outputted. At this time, when the physical address outputted from the TLB 201 is effective and it coincides with the physical address tag, it is regarded that the data buffer 202 has hit, thus the data outputted from the data cache is effective.

In the case where the TLB 201 misses, by accessing an address translation table in the external memory of the data processor 100 of the present invention by control of the operand access unit control circuit 205, the logical address is translated into the physical address and the entry of the TLB 201 is updated. After updating the TLB 20 entry, the TLB 201 is accessed again and hits.

In the case where the TLB 201 hits but the data buffer 202 which operates as the built-in data cache misses, by accessing the external memory by the physical address by control of the operand access unit control circuit 205, the entry of the data buffer 202 is updated.

When the TLB 201 misses, the data buffer 202 does not hit even when the physical address read from the TLB 201 and the physical address tag of the data cache are coincided. In this case, hit or miss of the data buffer 202 is judged after the TLB 201 entry has been updated and the TLB 201 has hit.

In the case where the data buffer 202 operates as the trace memory, at operand accessing, the data buffer 202 never accessed by other than the DMP instruction which makes the tracing results to be outputted to the outside of the data processor. In this case, data are fetched from outside by outputting physical addresses translated in the TLB 201 to the data processor 100 of the present, invention.

(5.3) "Data Write Operation of Operand Access Unit"

Data write operation for the operand access unit 120 is similar to the data read operation with respect to accessing of the TLB 201.

Though the write operation of the data buffer 202 resembles the data read operation, data is not read out from the data buffer 202.

In the data write operation, data are written in the entry which is hit when the data buffer 202 has hit. At a miss, data are not written in the entry of the data buffer 202 and the entry is also not updated.

In the case where the data buffer 202 operates as the trace memory, the data buffer 202 is not accessed at operand access operation. In this case, physical addresses translated in the TLB 201 are outputted to the outside of the data processor 100 of the present invention, and store data are outputted to the outside.

For storing processing of data to the outside, 2 clock cycles are necessary at a minimum, which is slower than the storing operation speed of the E stage 35 of the data processor 100 of the present invention. Accordingly, the store data is registered once in the store buffer together with the PC value of the instruction executing the storing operation, the physical address and the logical address of the storing destination, and then the store buffer performs the storing operation.

The PC value of the instruction which executes the storing operation and is registered in the store buffer is the PC value of the instruction inputted from the PC calculation unit 116.

(5.4) "Tracing Operation of Executed Instruction Address by Operand Access Unit"

The data buffer 202 of the data processor 100 of the present invention operates also as a trace memory by changing over the mode besides operating as an internal data cache.

In the case where the data buffer 202 operates as the trace memory, a PC value transferred from the PC calculation unit 116 is written into the data buffer 202 through a data input/output circuit 207. The entry address into which the PC value is to be written in the data buffer 202 is indicated by the entry pointer 209. The entry pointer 209 is cleared to "0" at the starting of tracing operation, and incremented whenever the PC value is written.

The data buffer 202 has the capacity of 4 bytes×2048 entries, and is able to register the 4-byte PC value up to 2048. Thereby, when the entry pointer 209 is incremented to the value of 2048, the data buffer 202 overflows and the debug trap is generated.

(5.5) "Trace Address Damping Operation by Operand Access Unit"

The data processor 100 of the present invention outputs the content of the data buffer 202 to the outside by executing the DMP instruction. An address of the external memory address of the output destination is indicated by a general register R0.

The traced result of the executed instruction address stored by operating the data buffer 202 as the trace memory is outputted to the outside by the DMP instruction and used in debugging of softwares.

The DMP instruction is also effective for diagnosing a data portion of the cache when the data buffer is operated as the internal data cache.

When the DMP instruction is executed, the entry pointer 209 is cleared to zero, and from the entry indicated by the entry pointer 209, the PC value is read into the data input/output circuit 207 and transferred to the store buffer. The content of the entry pointer 209 is incremented whenever the PC value is read.

In synchronism with reading the PC value out from the data buffer 202, an address of the external memory which is the transferring destination of the PC value is sent to the store buffer 208 from the integer operation unit 117 through the address output circuit 206. Head of the transferring destination address of the PC value is the value of the general register R0, and is outputted as begin incremented Four at a time in the integer operation unit 117 whenever the PC value is transferred.

(6) "External Access Operation"
(6.1) "Input/Output Signal Line"

Figure 24:
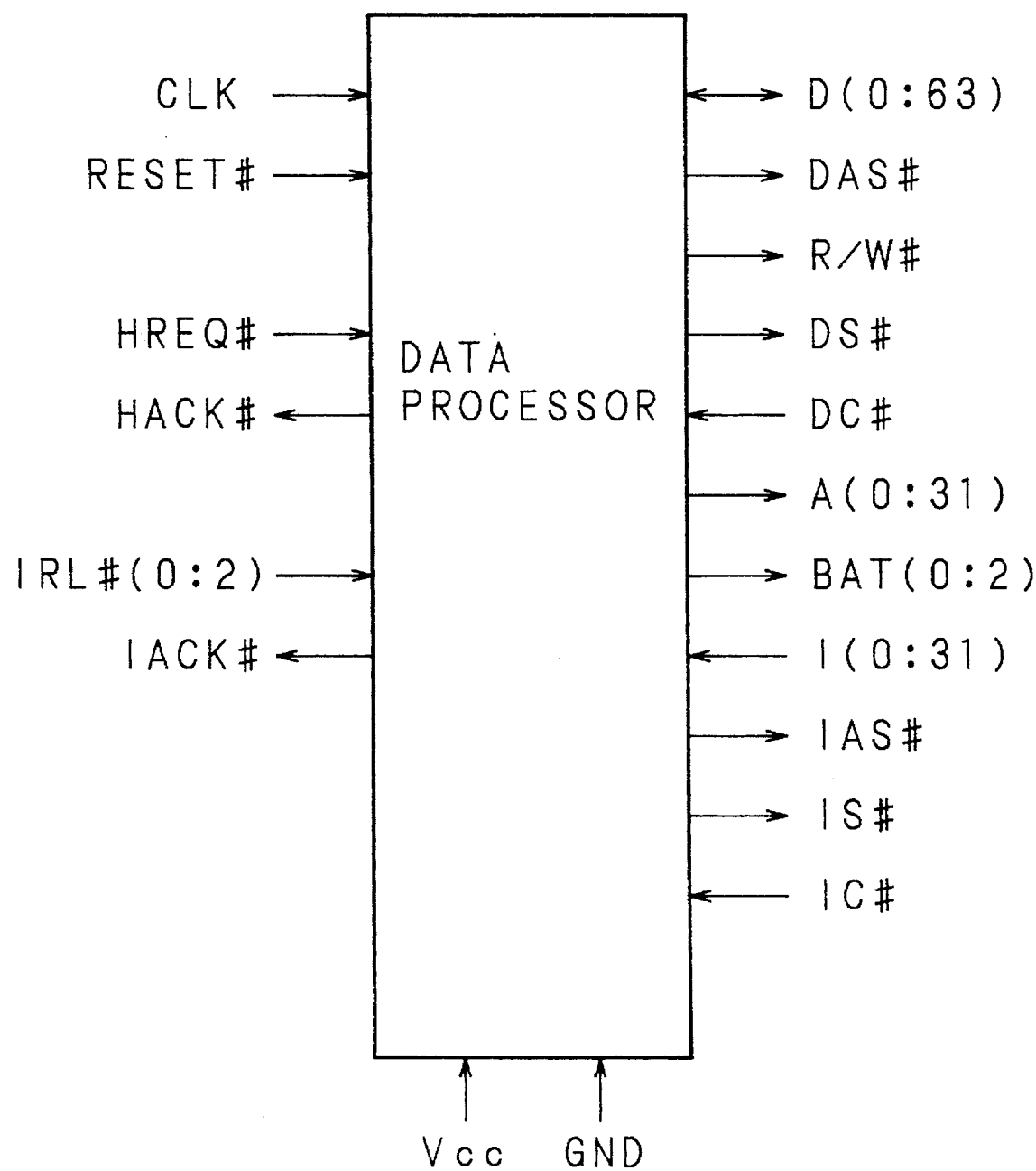
FIG. 24 is a schematic view showing the input/output signals of a data processor of the present invention.

FIG. 24 is a schematic view showing the input/output signals of the data processor 100 of the present invention.

To and from the data processor 100 of the present invention, besides a power source Vcc and ground GND, 64 data pins, 32 address pins, 32 instruction pins and an input clock CLK, various control signals are inputted and outputted.

In both cases of instruction access and data access, the physical address is outputted to the address pins.

The CLK is an external input clock which has a same frequency as an operation clock of the data processor 100 of the present invention.

Data address strobe DAS# (# represents a low active signal) indicates that the data address outputted to the address pin is effective.

Read write R/W# discriminates whether a bus cycle at the data pin is the input or output.

Data strobe DS# indicates that the data processor 100 of the present invention has completed data input preparation, or that data is outputted from the data processor 100 of the present invention.

DC# is a signal which notices the data processor 100 of the present invention to complete a data access cycle.

BAT(0:2) shows the meaning of values of the address pin, data pin and instruction pin as shown in FIG. 25.

Instruction address strobe IAS# indicates that the instruction address outputted to the address pin is effective.

Instruction strobe IS# indicates that the data processor 100 of the present invention has completed instruction input preparation.

IC# is a signal which notices the data processor 100 of the present invention to allow completion of an instruction access cycle.

Hold request HREQ# is a signal which requests the bus to the data processor 100 of the present invention, and HACK# is a signal which indicates that the data processor 100 of the present invention has accepted the hold request HREQ# and given the bus to the other device.

IRL(0:2) is an external interruption request signal.

IACK# is a signal which indicates that the data processor 100 of the present invention has accepted the external interruption and performing an interruption vector access cycle.

(6.2) "Access of External Devices"

In an example of the system shown in FIG. 1 using the data processor 100 of the present invention, the data processor 100 of the present invention and the data caches 107, 108 are connected also at the BAT(0:2), DAS#, R/W#, DS# and DC# besides the data bus 102 connected to the data pins and the address bus 101 connected to the address pins.

The data processor 100 of the present invention and the instruction cache 11 are connected also at the BAT(0:2), IAS#, IS# and IC# besides the instruction bus 103 and the address bus 101 connected to the instruction pins.

The CLK is a clock fed to the entire system and deciding the basic timing of the system.

At the time of bus access in a standard access mode, the data access using the data bus 102 and the instruction access using the instruction bus 103 are performed respectively for the external memory having a sufficient high speed, at the speed of once in two cycles of the external input clock CLK.

At the time of bus access in a burst access mode, the data access using the data bus 102 and the instruction access using the instruction bus 102 are performed respectively for the external memory having a sufficient high speed, at the speed of four times in five cycles of the external input clock CLK.

The address bus 101 is utilized for accessing both the data caches 107, 108 and the instruction cache 106.

(7) "Various Control Registers"
(7.1) "Configuration of Processor Status Word (PSW)"

Figure 26:
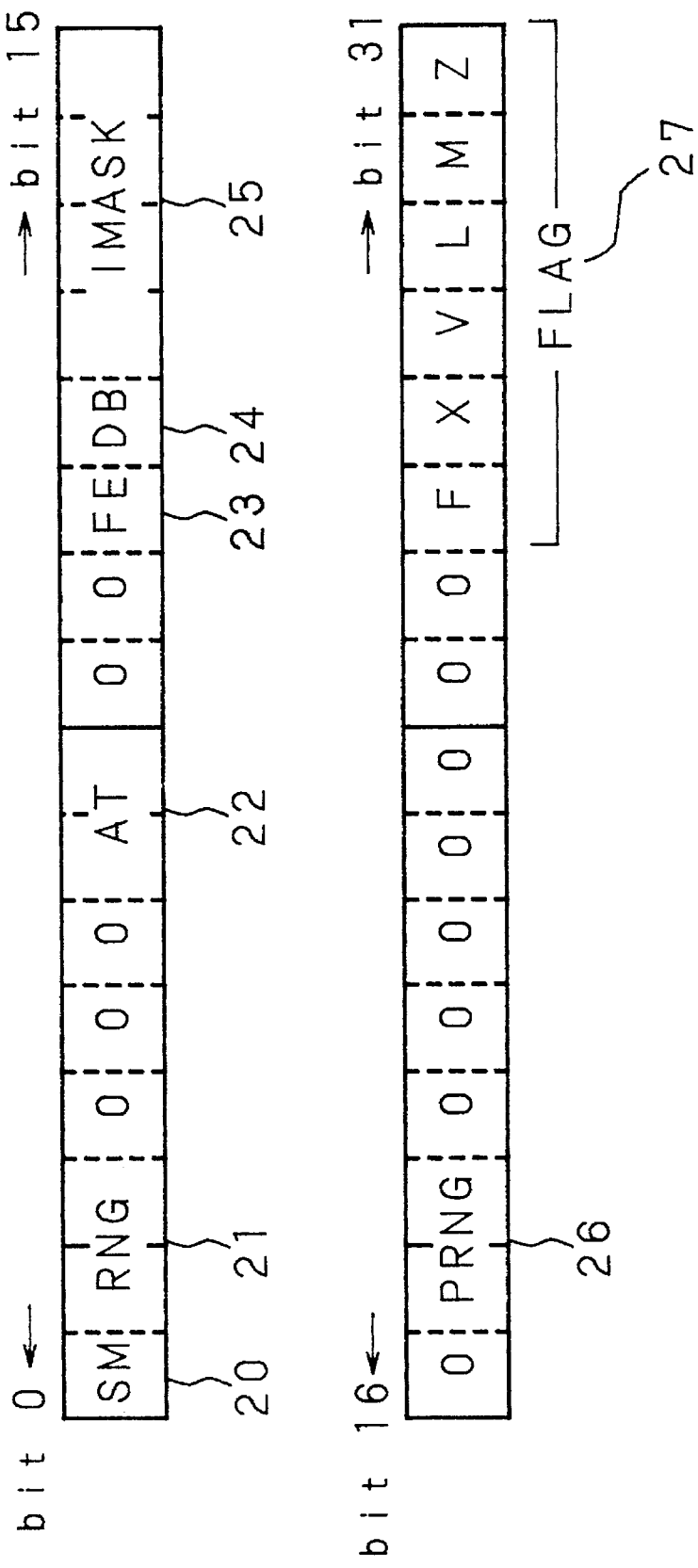
FIG. 26 is a schematic view showing the configuration of the processor status word (PSW) of the data processor of the present invention.

FIG. 26 is a schematic view showing the configuration of the processor status word (PSW) in the integer operation unit 117 of the data processor 100 of the present invention.

In FIG. 26, an SM bit 20 shows whether a stack pointer For interruption processing is in use or a stack pointer for ring O is in use at the ring O.

An RNG field 21 shows the ring number in which the program is executed.

An AT field 22 shows the address translation and memory protection modes.

An FE bit 23 shows the starting mode of the floating-point operation trap.

A DB bit 24 shows the debug environment. When DB=1, a debug support mechanism is ON, and in the case where the debug condition is satisfied, the self-debug trap is started. When DB=0, the debug support mechanism is OFF, and the self debug trap is not started even when the debug condition is satisfied.

An IMASK field 25 shows the mask level of external interruption. When the external interruption having higher priority than the mask level shown by the IMASK field 25 is inputted to the data processor 100 of the present invention, the interruption processing is started.

A PRNG field 26 shows the ring number of the ring which had called the present ring.

An FLAG field 27 shows flags related to the integer operation.

The PSW is cleared to all zero at resetting. The PSW is also able to be read the content and to be written the designated content respectively by the LDC instruction and STC instruction.

(7.2) Configuration of Debug Control Register.

FIG. 27 is a schematic view showing the configuration of a debug control register which controls the debug support function of the data processor 100 of the present invention.

The debug control register is a register which becomes effective when the DB bit 24 of the PSW is "1", and in the case where the DB bit 24 of the PSW is "0", it performs equivalent operation as the case where all bits are "0".

The debug control register is cleared to all zero at resetting. It is possible to read its content and to write the designated content respectively by the LDC instruction and the STC instruction.

In FIG. 27, an SX field 6 is a field which designates the step execution of the instruction to the data processor of the present invention and has the following meanings.

SX=00: Not under step execution mode.

SX=01: Under step execution mode. The instructions are executed one by one sequentially. Plural instructions is never taken in to the pipeline and processed simultaneously Thus, the exception and trap are received sequentially at intervals of each instruction. However, the instructions are prefetched.

SX=10: Under step execution mode. When the instruction such as the one generating disturbance in the instruction execution sequence such as the branch (except returning to the instruction right after the original instruction due to a prebranch error) is executed, a debug event is detected.

SX=11: Under step execution mode. Debug event is detected at intervals of each instruction.

The SA bit 1 is a bit showing the step execution status responding to the SX field 6, and has the following meanings.

SA=0: It shows that the debug event by the step execution is not detected.

SA=1: It shows that the debug event is detected in the step execution mode.

A TG bit 7 is a bit which controls validity and invalidity of the TGP0 and TGP1, which are the trigger point register for designating the start and end address of the tracing respectively, and has the following meanings.

TG=0: It invalidates the TGP0 and TGP1.

TG=1: When the instruction of the address set to the TGP0 or TGP1 is executed, the value of the trace memory control bit (T bit) 9 is changed over. Only the head instruction address is checked.

A J bit 8 is a bit which designates the operation mode when the data buffer 202 is operated as the trace memory, and has the following meanings.

J=0: PC values of all instructions are to be stored in the trace memory.

J=1: The PC value of the instruction such as the one producing disturbance in the instruction execution sequence such as the branch (except returning to the instruction right after the original instruction at a prebranch error), and the PC value of the instruction at the jump destination are to be stored.

The T bit 9 is a bit showing whether the data buffer 202 is operating as the trace memory, and having the following meanings.

T=0: The trace memory is not operated, and not under tracing.

T=1: The trace memory is operated,and under tracing.

A TA bit 2 is a bit showing whether the debug trap has occurred due to the overflow of the trace memory, and having the following meanings.

TA=0: It shows that the debug event was not detected by the overflow of the trace memory.

TA=1: It shows that the debug event was detected by the overflow of the trace memory.

An E bit 10 is a bit which controls validity and invalidity of the XBP0 and XBP1 which are the breakpoint register of the instruction address, and has the following meanings.

E=0: The XBP0 and XBP1 are invalidated.

E=1: When the instruction of the address set in the XBP0 or XBP1 is executed, the debug event is detected. Only the head instruction address is checked.

An EA field 3 is a field showing the execution break status responding to the E bit 10, and having the following meanings.

EA=00: It shows that the debug event is not detected at the address indicated by the XBP0 and XBP1.

EA=10: It shows that the debug event is detected at the address indicated by the XBP0.

EA=01: It shows that the debug event is detected at the address indicated by the XBP1.

EA=11: It shows that the debug event is detected both at the addresses indicated by the XBP0 and XBP1.

An R bit 11 is a bit which controls validity and invalidity of the OBP0 and OBP1 which are the breakpoint register for data read access, and has the following meanings.

R=0: The OBP0 and OBP1 and invalidated for the operand read access.

R=1: When the operand is read out from the address set in the OBP0 and OBP1, the debug trap is produced. Memory access for the indirect memory addressing is also the object for detecting the debug event. The debug event is not detected for reading out the instruction.

An RA field 4 is a field showing the break status for the data read responding to the R bit 11, and having the following meanings.

RA=00: It shows that the debug event is not detected when reading out from the address indicated by the OBP0 and OBP1.

RA=10: It shows that the debug event is detected when reading out from the address indicated by the OBP0.

RA=01: It shows that the debug event is detected when reading out from the address indicated by the OBP1.

RA=11: It shows that the debug event is detected when reading out from the address indicated by the OBP0 and OBP1.

A W bit 12 is a bit which controls validity and invalidity of the OBP0 and OBP1 which are the breakpoint register for the data write access, and has the following meanings.

W=0: The OBP0 and OBP1 are invalidated for the operand write access.

W=1: When the operand is written into the address set in the OBP0 or OBP1, the debug event is detected.

A WA field 5 is a field showing the break status for the data write responding to the W bit 12, and having the Following meanings.

WA=00: It shows that the debug event is not detected by writing into the address indicated by the OBP0 and OBP1.

WA=10: It shows that the debug event is detected by writing into the address indicated by the OBP0.

WA=01: It shows that the debug event is detected by writing into the address indicated by the OBP1.

WA=11: It shows that the debug event is detected by writing into the address indicated by the OBP0 and OBP1.

(7.3) "Debug Assist Registers"

In order to assist the operation of the debug control register, the data processor 100 of the present invention has a trace count register, trigger point registers, a break count register, instruction address breakpoint registers and operand address breakpoint registers.

For each of these debug assist registers, it is possible to read its content and to write the designated content respectively by the LDC instruction and the STC instruction.

FIG. 28 is a schematic view showing the configuration of the trace count register.

The trace count register indicates the number of instruction addresses stored during the operation of the data buffer 202 as the trace memory. This register is in the integer operation unit 117, and controlled by a first micro ROM unit 113.

FIG. 29 is a schematic view showing the configuration of the trigger point registers.

The trigger point registers are composed of two registers of the TGP0 and TGP1 in the operand access unit 120, and indicate the instruction address of the start of tracing and the instruction address of the end of tracing respectively.

Figure 30:
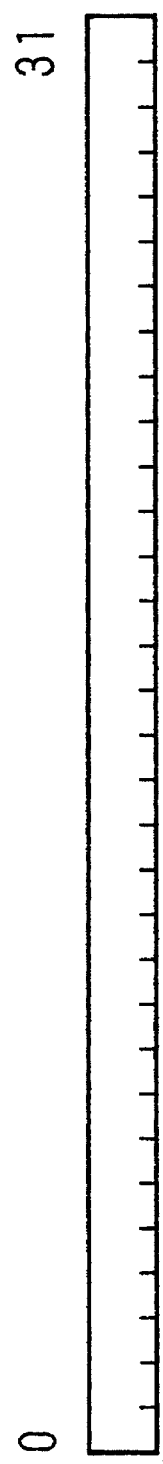
FIG. 30 is a schematic view showing the configuration of the break count register of the data processor of the present invention.

FIG. 30 is a schematic view showing the configuration of the break count register.

The break count register counts the number of self-debug traps detected in the OBP0, OBP1, XBP0, XBP1 or step execution mode.

This register decrements its value one at a time whenever the self debug trap due to the breakpoint is detected, and starts the EIT processing when the self-debug trap due to the breakpoint is detected when the break count register value is zero.

This register is in the integer operation unit 117, and controlled by the first micro ROM unit 113.

Figure 31:
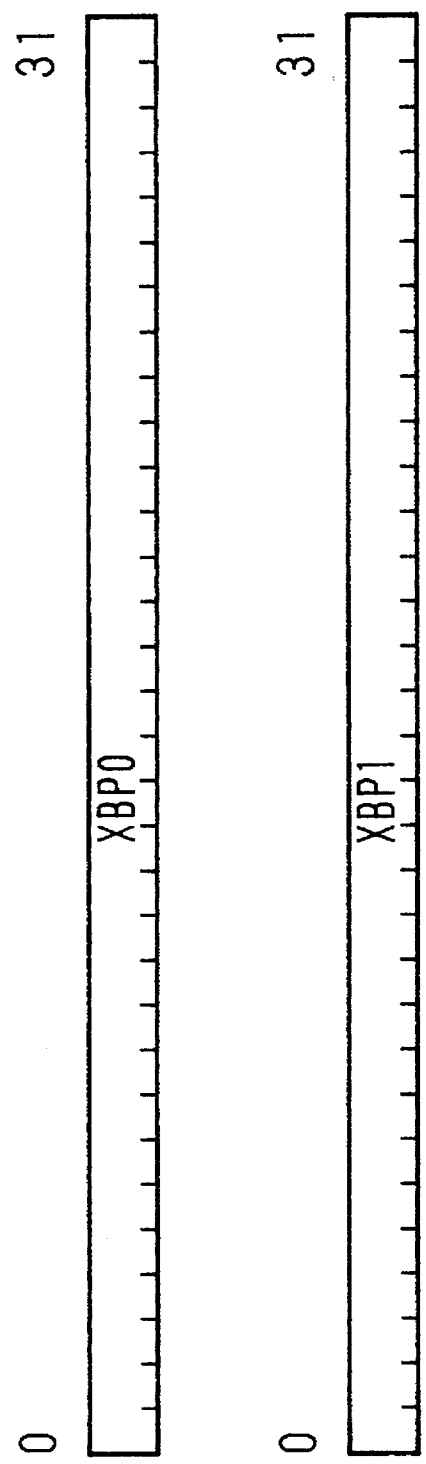
FIG. 31 is a schematic view showing the configuration of the instruction address break point register of the data processor of the present invention.

FIG. 31 is a schematic view showing the configuration of the instruction address breakpoint registers.

The instruction address breakpoint registers are composed of two registers of the XBP0 and XBP1 in the PC calculation unit 116, and store the breakpoint address for the instruction executed.

Figure 32:
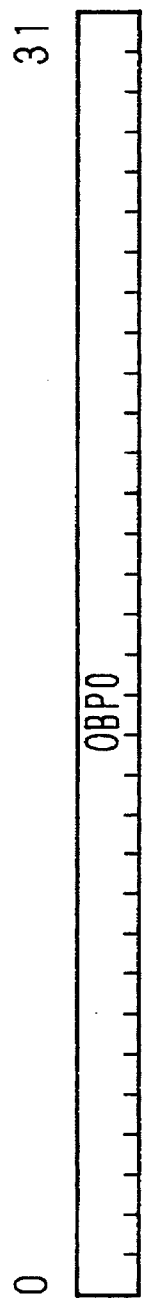
FIG. 32 is a schematic view showing the configuration of the operand address break point register of the data processor the present invention.

FIG. 32 is a schematic view showing the configuration of the operand address breakpoint registers.

The operand address breakpoint registers are composed of two registers of the OBP0 and OBP1 in the operand access unit 120, and store the breakpoint address for the operand access.

(7.4) "Buffer Memory Control Register"

Figure 33:
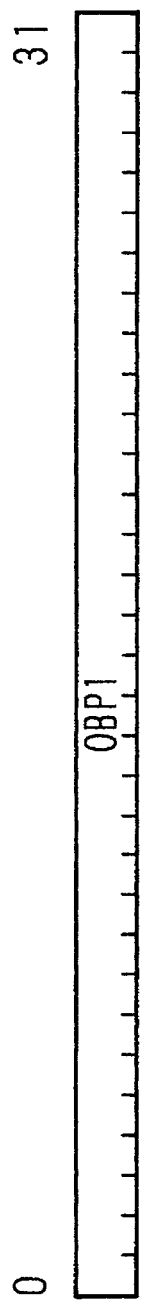
FIG. 33 is a schematic view showing the configuration of the buffer memory control register of the data processor of the present invention.

FIG. 33 is a schematic view showing the configuration of the buffer memory control register which controls the data buffer 202 and the internal instruction cache of the data processor 100 of present invention.

A DM field 28 is a field which controls the data buffer 202, and has the following meanings.

DM=00: The data buffer is not operated.

DM=01: The data buffer is operated as the data cache and is the cache freeze state.

DM=10: The data buffer is operated as the data cache of 16-byte line size.

DM=11: The data buffer is operated as the data cache of 32-byte line size.

An IM field 29 is a field which controls the internal instruction cache, and has the following meanings.

IM=00: The internal instruction cache is not operated.

IM=01: The internal instruction cache is operated and is the cache freeze state.

IM=10: The internal instruction cache is operated as the cache of 16-byte line size.

IM=11: reserved (8) "Exception Processing Function of the data processor of the Present Invention"

(8.1) "Types of EIT detected by the Data Processor of the Present Invention"

As the EIT occurs in the data processor 100 of the present invention, as the EIT not depending on the instruction, there are a page fault exception which is detected when there are no data and instruction corresponding to the logical address accessed on the main memory 109 and the page fault has occurred, an address translation exception which occurs when an error occurs while translating the logical address into the physical address, and a violence access related to memory protection violation and the I/O area occurs, and a bus access exception which occurs when there is no response from the bus within a predetermined time and the memory access is not executed in the instruction or operand access.

As the EIT occurs depending the instruction, there are an odd address jump trap which occurs when the jump destination address of the jump instruction is an odd number, a reserve instruction exception which occurs when the unallocated instruction and a bit pattern of the addressing mode are to be executed, a zero divide trap which occurs when zero divide is performed in the integer operation, a floating-point operation trap which occurs when the unmasked exception is detected at executing the floating-point instruction, an unconditional trap which occurs by the TRAPA instruction and a conditional trap which occurs by the TRAP/cc instruction.

In addition, there are a self debug trap which occurs when the instruction address hits a breakpoint or the instruction is executed in the single step mode, and further, an external interruption which occurs by external hardware signals and a debugger interruption which is a hardware trap for incircuit emulator.

(8.2) "Operation at starting EIT Processing Handler"

In the data processor 100 of the present invention, when the EIT is detected, the microprogram according to the following procedures is executed and the EIT processing handler is started.

Firstly, a vector number responsive to the detected EIT is generated in the data processor 100 of the present invention.

Secondly, an EIT vector table which is on the memory space, and in which a start address of the processing handler relative to respective EITs and an EIT vector are stored in a pair is accessed.

Each entry of the EIT vector table is constituted by 8 bytes, and data for updating processor status word (PSW) of the data processor 100 of the present invention before the processing is moved to the EIT processing handler is included.

Thirdly, NEXTPC which is the PC value of the return destination instruction for returning to the original instruction sequence after returned from the EIT processing handler, PSW before staring the EIT and EITINF which is various information related to the detected EIT such as the detected EIT number are saved in the stack.

Moreover, when necessary, information such as the PC value of the instruction detecting the EIT is saved in the stack.

The stack frame generated by these processings are dependent on the types of EIT, and classified into five formats.

Fourthly, PSW is updated in response to the EIT vector table entry which is read in. At this time, when the reserved value tends to be set in the PSW, a system error occurs. By updating the PSW, a ring number which becomes memory protection information can be updated and the presence or absence of the address translation, debug environment, interruption mask level and floating-point operation trap receipt mode can be permuted.

Finally, a jump to the PC value fetched from the EIT table entry is performed and the EIT processing handler is started. When the EIT is detected in multiple and the unprocessed EIT is not inhibited, before executing the start instruction of the EIT processing handler, processing for starting the EIT processing handler for the unprocessed EIT is performed.

(8.3) "Return Operation to Original Instruction Train from EIT Processing Handler"

After completing the processing corresponding to each EIT by the EIT processing handler, in the REIT instruction executed at the end in the EIT processing handler, the microprogram which performs the following processings is executed, and the processing returning to the original instruction stream is performed.

Firstly, the PSW value and EITINF at the time point where the EIT is detected are read from the stack, and successively, logical address of the return destination instruction is read from the stack.

Moreover, by format information in the EITINF, it is judged whether additional information is present, in the case where there is the additional information, it is read from the stack. The additional information differ respectively depending on five formats.

Secondly, all fields of the PSW are returned to the value before the generation of EIT according to the PSW value at the time point where the EIT read from the stack is detected.

In addition, there are instances that reexecution of write cycle by the store buffer which generated the EIT is executed during execution of the REIT instruction.

Thirdly, a jump to the logical address of the return destination instruction read from the stack is executed, and returned to the original instruction stream.

(9) "Utilization Example of Trace Memory"

In the data processor 100 of the present invention, when the DB bit 24 of the PSW is set to "0" and the TG bit 7 or the T bit 9 of the debug control register is set to "1", the data buffer 202 operates as the trace memory independently of the DM field 28 of the buffer memory control register.

Operations of the debug control register such as settling the TG bit 7 and the T bit 9 are performed in the state wherein the DB bit 24 of the PSW is set to "0" by a handler of system programs, and the DB bit 24 of the PSW is set to "1" when returning to the user program from the handler.

In the case where the T bit 9 is set to "1", the tracing is started immediately from the time point where the DB bit 24 becomes "1".

In the case where the TG bit 7 is set, the address instruction indicated by the TGP0 or TGP1 is executed to set the T bit 9, thereby the tracing is started.

The tracing is completed by clearing the DB bit 24 of the PSW from "1" to "0" when the trace memory overflows, or at starting the break debug trap following the execution of the address instruction indicated by the XBP0 and XBP1.

When the DMP instruction is executed in the handler for the debug trap, the traced result stored in the data buffer 202 is damped to the external memory. Also, by reading the trace count register value by the STC instruction at this time, the number of PC values which are the traced result damped can be known.

Tracing may be completed by executing the instruction of the address indicated by the register of the TGP0 or TGP1 and clearing the T bit 9 without starting the debug trap.

In the case where the J bit 8 of the debug control register is "0", the PC values of all instructions executed during the T bit 9 is "1" are stored in the data buffer 202 as the traced result. In the case where the J bit 8 is "1", however, only the PC value of the instruction which disturbs the instruction sequence due to the occurrence of the jump or EIT, and the PC value of the jump target instruction at that time are sent to the operand access unit 120 from the PC calculation unit 116, and stored in the data buffer 202 as the traced result.

In the case where the J bit 8 is "1", the PC value of the instruction executed between the jump target instruction of the traced result and the PC values of the instructions which are executed before the next jump are not traced. Accordingly, to obtain the traced result of the PC values of all instructions, though the analytical processings by softwares are necessary separately, as compared with the case wherein the J bit 8 is "0" the trace memory is saved, thus it is possible to trace a long section.

FIG. 34 is a flow chart showing a first specific example of the tracing operation, in which the tracing from the instruction of address H'00004000 (H' represents a hexadecimal digit) designated by the TGP0 until the instruction of address H'00005000 designated by the TGP1 is executed is performed by setting the J bit 8 to "1".

At first, the handler is started by the TRAP instruction, and at that time, the DB bit 24 of the PSW is set to "0" (Step S1).

Next, the TG bit 7 and J bit 8 of the debug control register are both set to "1" and each of the other bits is set, to "0" by the LDC instruction (Step S2), and furthermore, H'00004000 is loaded in the TPG0 and H'00005000 in the TPG1 respectively (Step S3, S4).

Then, the processing returns from the handler by the REIT instruction, and at that time the DB bit 24 of the PSW is set to "1" (Step S5).

Next, the PC value of the instruction (herein after called as instruction A) executed in the E stage 35 coincides with the address H'00004000 designated by the TGP0, and the T bit D of the debug control register changes to "1" from "0" to start the tracing operation. At this time, the trace count register is cleared to zero (Step S6).

The PC values of the instruction which disturbs the instruction sequence among the instructions executed in the E stage and the instruction of the jump destination are transferred to the operand address access unit 120 from the PC calculation unit 116 and registered in the data buffer 202.

The trace count register is incremented whenever the PC value is transferred (Step S7).

When the PC value of the instruction (herein after called as instruction B) executed in the E stage 35 coincides with the address H'00005000 designated by the TGP1, and the T bit 9 of the debug control register changes to "0" from "1", the tracing operation is stopped (Step S8).

Next, the handler is started by the TRAP instruction, and at this time, the DB bit 24 of the PSW is set to "0" (Step S9).

Then, the content of the data buffer 202 is read into an external memory area starting from the address indicated by the R0 by the DMP instruction (Step S10).

Finally, the content of the trace counter is read by the STC instruction (Step S11).

Figure 35:
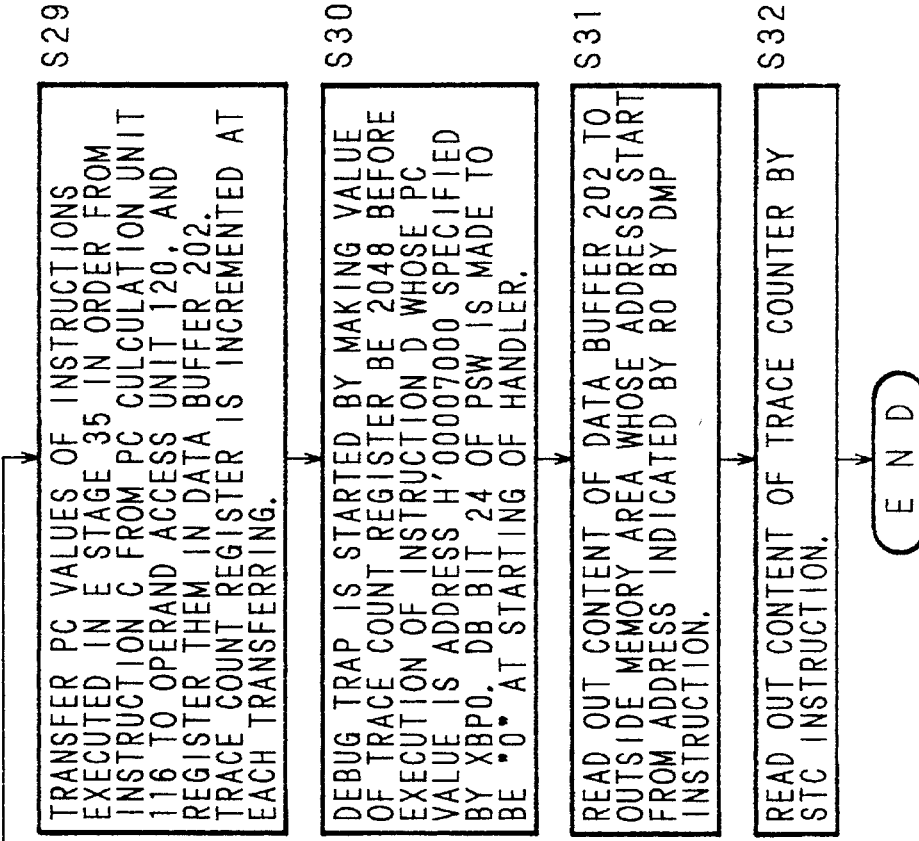
FIG. 35 is a flow chart showing a second specific example of the tracing operation of the data processor of the present invention.

FIG. 35 is a flow chart showing a second specific example of the tracing operation, in which the tracing from the instruction of address H'00006000 designated by the TGP0 until the instruction of address H'00007000 designated by the XBP0 is executed is performed by setting the J bit 8 to "0", and finished by the overflow of the trace memory before executing the instruction of address H'00007000.

At first, the handler is started by the TRAP instruction, and at that time the DB bit 24 of the PSW is set to "0" (Step S21).

Then, the TG bit 7 and the E bit 10 of the debug control register are set to "1" and each of the other bits is set to "0" by the LDC instruction (Step S2), and furthermore, H'00006000 is loaded in the TPG0 and TPG1, and H'00007000 is loaded in the XBP0 and XBP1 respectively (Steps S22 through S26).

Next, the processing returns from the handler by the REIT instruction, and at that time the DB bit 24 of the PSW is set to "1" (Step S27).

Next, when the PC value of the instruction (herein after called as instruction C) executed in the E stage 35 coincides with the address H'00006000 designated by the TGP0, and the T bit 9 of the debug control register changes to "1" from "0", the tracing operation is started. At this time, the trace count register is cleared to zero (Step S28).

Sequentially from the PC value of the instruction C, the PC value of the instruction executed in the E stage 35 is transferred to the operand access unit 120 from the PC calculation unit 116, is and registered in the data buffer 202. The trace count register is incremented whenever the PC value is transferred (Step S29).

When value of the trace count register becomes 2048 before executing the instruction D having the PC value of address H'00007000 designated by the XBP0, the data buffer 202 overflows and the debug trap is started. At the starting of the handler, the DB bit 24 of the PSW is set to "0" (Step S30).

Next, the content of the data buffer 202 is read into an external memory area starting from the address indicated by the R0 by the DMP instruction (Step S31).

Finally, the content of the trace counter is read by the STC instruction (Step S32).

(10) "Another Embodiments of the Present Invention"

in the abovementioned embodiment, though an example in which the values of the T bit of the debug control register 35 which is the data buffer memory control register which instructs the data buffer to operate as the trace memory, and the DM field of the buffer to operate as the data cache can be set independently has been explained. It is also possible to construct in such a manner to instruct the case wherein the data buffer operates as the data cache, and the case wherein the data buffer operates as the trace memory in one bit in one register.

Also, in the embodiment mentioned above, though an example in which the program counter value of the instruction executed is stored in the trace memory has been explained, it may be constructed such that other trace information such as the memory operand address read or the memory operand address stored are stored in the trace memory.

As aforementioned, the data processor of the present invention, according to the first invention, comprises an instruction decoding unit for decoding instructions, an instruction execution unit (operation unit) for executing the instructions, a control unit (micro ROM unit) which is connected to the instruction decoding unit and controls the operation unit according to the output of the instruction decoding unit, a memory (data buffer) which operates as a data cache or a trace memory for storing debug information by changing over the modes, and a debug control register which holds information designating the modes of the data buffer, and the data buffer operating as the usual data cache when the TG bit and T bit of the debug control register are set to "0", and operating as the trace memory when the DB bit of the PSW is "1" and the TG bit and T bit of the debug control register are set to "1" so as to store the program counter value calculated in the PC calculation unit of the instruction executed in the operation unit as the trace information.

Thereby, since the data buffer which is a high-speed memory can be utilized not only as the cache memory but also as the trace memory, it can be used efficiently. The trace information is once stored in the data buffer and read into the external memory from the data buffer by the exclusive DMP instruction after completing the tracing, so that even when the data processor of the present invention is realized on one integrated circuit, an exclusive output pins for outputting the trace information to the external memory is not necessary, and the speed of the external memory can be reduced as compared with that of the instruction processing at tracing.

Furthermore, in the debug control register, the J bit which controls the program counter value to be stored selectively in the trace memory is provided, and when the data buffer is operated as the trace memory in the case where the J bit is set to "1", the instruction which disturbs the program execution sequence due to the execution of jump and the occurrence of the exception and trap, and the program counter value of the instruction of the jump destination are only stored selectively in the trace memory, so that the trace memory can be used effectively and the tracing distance can be elongated.

In the second invention, the trace count register which counts the number of program counter values as trace information stored during the trace memory operation by the data buffer, and the debug trap are started when the data buffer overflows at the tracing operation. By this function, when the trace memory overflows, the tracing is interrupted immediately and the trace information is read out by the debug processing the handler, thereby it is simply possible to continue the tracing further by clearing the trace count register, or to perform the analytical processing of the trace information by completing the tracing at the time of overflow. When the tracing is completed before the overflow, the trace count register value is also applicable as information for obtaining the number of effective information of the trace memory.

Moreover, in the third information, since only the program counter value of the instruction having been completed is stored in the trace memory, the program counter value of the instruction, whose execution and decoding is subjected to the pipeline processing, decoded but not executed is not to be traced. Thus, even when the pipeline processing is performed, only the program counter value of the instruction which is always executed actually is stored in the trace memory.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A data processor, coupled to an external memory that stores data and instructions and including a memory interface comprising memory address and data buses for transferring data and instructions between said external memory and said data processor, said data processor comprising:

an instruction decoding unit for decoding an instruction to be executed and generating a decoded result based on said instruction;

a program counter generating means for generating a program counter value identifying an instruction to be executed;

an instruction execution unit for executing said instruction, calculating an address of an operand to be processed, and forming resultant operand data;

a control unit which is connected to said instruction decoding unit and said instruction execution unit, and controls said instruction execution unit according to the decoded result generated by said instruction decoding unit;

a high-speed storing means;

control information holding means, included in said instruction execution unit, for holding high speed-storing means control information, said control information including a first part having either a first or second value, with the value of said control information held in said control information holding means set by said control unit according to the decoded result generated by said instruction decoding unit;

data input/output means, responsive to said control information, having a first input/output port coupled to said high-speed storing means and having a second input/output port coupled to said instruction execution unit, said data input/output means for selectively transferring a program counter value of an instruction executed in said instruction execution unit to said high-speed storing means in response to said control information having said first value so that program counter values are stored in said high-speed storing means; and an operand access control unit, coupled to said instruction execution unit to receive operand data and coupled to said control information holding means, for preventing access to said high-speed storing means to transfer operand data when said control information has said first value so that operand data must be transferred between said data processor and said external memory when program counter values are stored in said high-speed storing means and for permitting access to said high-speed storing means when said control information has said second value so that operand data is transferred between said instruction execution unit and said high-speed storing means when program counter values are not stored in said high-speed storing means.

2. The data processor as set forth in claim 1 wherein:

said control information has a second part, having either a third or fourth value; and when said high-speed storing means functions as a trace memory said data input/output means is responsive to said second part having said third value to store only a program counter value of a jump instruction and of a target address of said jump instruction and responsive to said second part having said fourth value to store a program counter value of each instruction executed.

3. The data processor of claim 1 further comprising:

trace address generating means, selectively coupled to said high-speed storing means when said control information has said first value, for generating a trace information address specifying a storage location in said high-speed storing means.

4. The data processor of claim 3 wherein said trace address generating means comprises:

a pointer having an output selectively coupled to an address input of said high-speed storing means;

means for resetting said pointer;

means for incrementing said pointer when said data input/output means transfers a program counter value to said high-speed storing means.

5. The data processor of claim 1 wherein:

said control unit responds only to a decoded result generated from a specialized instruction to transfer program counter values from said high-speed storing means to said external memory.

6. A data processor having a memory interface comprising memory address and data buses for coupling the data processor to an external memory, said data processor comprising:

an instruction decoding unit for decoding instructions and generating a decoded result based upon an instruction to be executed;

a trace information generating unit, coupled to said instruction decoding unit, for generating trace information related to an instruction being decoded;

an instruction execution unit for executing the instructions decoded by said decoding unit to generate operand data;

a control unit which is connected to said instruction decoding unit and said instruction execution unit, and controls said instruction execution unit according to the decoded result of said instruction decoding unit;

a high-speed storing means, having a predetermined number of storage locations and coupled to receive operand data from said instruction execution unit or trace information from said trace information generating unit, with said trace information identifying the instruction executed in the execution unit or the location of operand data, said high-speed storing means for storing either trace information data or operand data at storage locations in said storage means; and an operand access control unit, coupled to said instruction execution unit to receive said operand data, for preventing access to said high-speed storing means to transfer operand data when said high-speed storing means stores trace information so that operand data must be transferred between said data processor and said external memory when trace information is stored in said high-speed storing means and for permitting access to said high-speed storing means when said high-speed storing means stores operand data so that operand data is transferred between said instruction execution unit and said high-speed storing means when trace information is not stored in said high-speed storing means;

a pointer, having an input coupled to said instruction execution unit, for counting a number of storage locations holding trace information and for indicating an overflow condition when said number exceeds said predetermined number; and means, coupled to said pointer, for generating an exception for dumping trace information from said high-speed storing means to said external memory.

7. A data processor having a memory interface comprising memory address and data buses for coupling the data processor to an external memory, said data processor comprising:

an instruction decoding unit for decoding instructions and generating an output signal based upon an instruction to be executed;

a start register for holding a start program counter value identifying a first instruction of a series of instructions to be traced;

a program counter generating means, coupled to receive said start program counter value from said start register, for generating a program counter value identifying an instruction, decoded by said instruction decoding unit, to be executed, said program counter generating means for generating a next program counter value of a next instruction to be decoded by said instruction decoding unit, for comparing said program counter value identifying the instruction to be executed to said start program counter value held in said start register to make a determination of whether said values are coincident, and for outputting said program counter value of an instruction to be executed;

an instruction execution unit for calculating an operand address of an operand to be processed, executing the instructions decoded by said decoding unit to process source operands and to generate result operands resulting from executing said instructions;

a control unit which is connected to said instruction decoding unit and said instruction execution unit, and inputs the output signal of said instruction decoding unit to control said instruction execution unit;

a high-speed storing means;

storing control means, coupling said high-speed storing means to said instruction execution unit and responsive to the determination made by said program counter generating means, for controlling said high-speed storing means to function as a trace memory to store said program counter value of said instruction executed in said instruction execution unit as trace data after the program counter value of the instruction to be executed is coincident with said start program counter value held in said start register during a trace operation and as a data cache to store said operand otherwise;

an operand access control unit, coupled to said instruction execution unit, for preventing access to said high-speed storing means to transfer operand data when said high-speed storing means stores a program counter value so that operand data must be transferred between said data processor and the external memory when a program counter value is stored in said high-speed storing means and for permitting access to said high-speed storing means when said high-speed storing means stores operand data so that operand data is transferred between said instruction execution unit and said high-speed storing means when a program counter value is not stored in the high-speed storing means.

8. A data processor, coupled to an external memory that stores data and instructions and including a memory interface for transferring data and instructions between said external memory and said data processor, said data processor comprising:

an instruction decoding unit for decoding an instruction to be executed and generating a decoded result based on said instruction;

a program counter generating means for generating a program counter value identifying a next instruction code;

an instruction execution unit for executing said instruction to be executed, calculating an address of an operand to be processed, and forming resultant operand data;

a control unit which is connected to said instruction decoding unit and said instruction execution unit, and controls said instruction execution unit according to the decoded result generated by said instruction decoding unit;

a high-speed storing means for storing instruction codes;

control information holding means for holding high speed storing means control information, said control information including a first part having either a first or second value, with the value of said control information held in said control information holding means set by said control unit according to the decoded result generated by said instruction decoding unit;

data input/output means, having a first input/output port coupled to said high-speed storing means and having a second input/output port coupled to said instruction execution unit, with said control unit controlling said data input/output means to selectively transfer a program counter value of an instruction executed in the execution unit to said high-speed storing means in response to said control information having a first value so that program counter values are stored in said high-speed storing means; and an access control unit, coupled to said instruction decoding unit to send instruction codes, to said program counter generating means to receive said program counter value, and to said control information holding means, said access control unit for preventing access to said high-speed storing means to transfer instruction codes when said control information has said first value so that said instruction codes must be transferred to said data processor from the external memory when program counter values are stored in said high-speed storing means and for permitting access to said high-speed storing means when said control information has said second value so that instruction codes are transferred to said instruction decode unit from said high-speed storing means when program counter values are not stored in said high-speed storing means.

9. In a data processing system for executing instructions in a program, with the data processing system coupled to an external memory, and with the data processing system including register locations for holding values, and a high-speed data buffer, a method for controlling said high-speed data buffer, while executing said program, to function either as a data cache or as a trace memory, said method comprising the steps of:

setting a value of a buffer control signal, held in a first register location, to a first logical value indicating that the high-speed data buffer is to function as a data cache or a second logical value indicating that the high-speed data buffer is to function as a trace memory;

fetching an instruction to be executed identified by a program counter value;

executing said instruction to generate a result operand value and a destination address;

if said buffer control signal has said second logical value:
storing said program counter value in said high-speed data buffer so that said high-speed data buffer functions as a trace memory;
writing said result operand to a location in said external memory specified by said destination address so that trace information is stored in
said high-speed data buffer while the program is executed by the data processing system;

if said buffer control signal has said first logical value:
storing said result operand at a location in said high-speed data buffer specified by said destination address.

10. The method of claim 9 further comprising the steps of:

transferring a program counter value from the high-speed data buffer to the external memory if the buffer control signal has said second value and said instruction to be executed is a dumping instruction.

11. The method of claim 9 further comprising the steps of:
when said buffer control signal has said second logical value:
initializing a pointer value;
storing the program counter to a location in the high-speed data buffer indicated by the pointer value;
incrementing the pointer value when a program counter value is stored in the high-speed data buffer;
generating an overflow indication when said pointer value indicates an overflow of said high-speed data buffer.

12. The method of claim 11 further comprising the step of:
transferring the contents of the high-speed data buffer to the external memory when the overflow indication is generated.

13. The method of claim 9 further comprising the steps of:
setting a first comparison value, held in a third register location, to a program counter stop value;
comparing the program counter value to the program counter stop value;
changing the value of the buffer control signal to the first logical value from the second logical value if the program counter value is equal to the program counter stop value.

14. In a data processing system for executing instructions, with the data processing system coupled to an external memory, and with the data processing system including register locations for holding values, and a high-speed data buffer, a method for controlling said high-speed data buffer to function either as a data cache or as a trace memory, said method comprising the steps of:
setting a first comparison value, held in a first register location, to a program counter start value;
fetching an instruction to be executed identified by a program counter value;
executing said instruction to generate a result operand value and a destination address;
comparing the program counter value to said program counter start value;
changing a value of a buffer control signal, held in a second register location, from a first logical value, with the first logical value indicating that the high-speed data buffer is to function as a data cache, to a second logical value indicating that the high-speed data buffer is to function as trace memory if said program counter value is equal to said program counter start value;
if said buffer control signal has said second logical value:
storing said program counter value in said high-speed data buffer so that said high-speed data buffer functions as a trace memory;
writing said result operand to a location in said external memory specified by said destination address;
if said buffer control signal has said first logical value:
storing said result operand at a location in said high-speed data buffer specified by said destination address.

15. In a data processing system for executing instructions, with the data processing system coupled to an external memory, and with the data processing system including register locations for holding values, and a high-speed data buffer, a method for controlling said high-speed data buffer to function either as a data cache or as a trace memory, said method comprising the steps of:
setting a value of a buffer control signal, held in a first register location, to a first logical value indicating that the high-speed data buffer is to function as a data cache or a second logical value indicating that the high-speed data buffer is to function as a trace memory;
setting a value of trace control signal, held in a second register location, to a third logical value if only program counter values of instructions which change a program sequence, such as a jump or branch instruction, are to be traced or to a fourth logical value if all instructions are to be traced;
fetching an instruction to be executed identified by a program counter value;
executing a fetched instruction to generate a result operand value and a destination address if said fetched instruction is not an instruction that changes a program sequence or to change a program sequence if said fetched instruction is an instruction that changes a program sequence;
if said buffer control signal has said first logical value:
storing said operand data in said high-speed data buffer if said fetched instruction is not an instruction that changes the program sequence;
if said buffer control signal has said second logical value and if said trace control signal has said fourth logical value either:
storing said program counter value in said high-speed data buffer so that said high-speed data buffer functions as a trace memory;
writing said result operand to a location in said external memory specified by said destination address if said fetched instruction does not change a program sequence; or
storing said program counter value in said high-speed data buffer so that said high-speed data buffer functions as a trace memory and changing the program sequence if said fetched instruction changes a program sequence;
if said buffer control signal has said second logical value and if said trace control signal has said third logical value either:
storing said program counter value in said high-speed data buffer so that said high-speed data buffer functions as a trace memory and changing the program sequence if said fetched instruction changes a program sequence; or
writing said result operand to a location in said external memory specified by said destination address and not storing said program counter in said high-speed data buffer if said fetched instruction does not change a program sequence.

16. In a data processing system for executing instructions in a program, with the data processing system coupled to an external memory, and with the data processing system including register locations for holding values, and a high-speed data buffer, a method for controlling said high-speed data buffer, while executing said program, to function either as a data cache or as a trace memory, said method comprising the steps of:
setting a value of a buffer control signal, held in a first register location, to a first logical value indicating that the high-speed data buffer is to function as a data cache or a second logical value indicating that the high-speed data buffer is to function as a trace memory;
fetching an instruction to be executed identified by a program counter value;

executing said instruction to generate a source address specifying a location of an operand value to be read from memory;
if said buffer control signal has said second logical value:
storing said program counter value in said high-speed data buffer so that said high-speed data buffer functions as a trace memory;
reading said operand value from the location in said external memory specified by said source address so that trace information is stored in said high-speed data buffer while the program is executed by the data processing system;
if said buffer control signal has said first logical value:
reading said operand value from the location in said high-speed data buffer specified by said source address.

17. The method of claim 16 further comprising the steps of:
transferring a program counter value from the high-speed data buffer to the external memory if the buffer control signal has said second logical value and an instruction to be executed is a dumping instruction.

18. The method of claim 16 further comprising the steps of:
when said buffer control signal has said second logical value:
initializing a pointer value;
storing the program counter to a location in the high-speed data buffer indicated by the pointer value;
incrementing the pointer value when a program counter value is stored in the high-speed data buffer;
generating an exception indication when said pointer value indicates an overflow of said high-speed data buffer.

19. The method of claim 18 further comprising the step of:
transferring data held in the high-speed data buffer to the external memory in response to an exception indication being generated.

20. The method of claim 16 further comprising the steps of:
setting a second comparison value, held in a third register location, to a program counter stop value;
comparing the program counter value to the program counter stop value;
changing the value of the buffer control signal to the first logical value from the second logical value if the program counter is equal to the program counter stop value.

21. In a data processing system for executing instructions in a program, with the data processing system coupled to an external memory, and with the data processing system including register locations for holding values, and a high-speed data buffer, a method for controlling said high-speed data buffer, while executing said program, to function either as a data cache or as a trace memory, said method comprising the steps of:
setting a first comparison value, held in a first register location, to a program counter start value;
setting a value of a buffer control signal, held in a second register location, to a first logical value, with the first logical value indicating that the high-speed data buffer is to function as a data cache;
fetching a sequence of instructions to be executed, with each instruction fetched identified by a program counter value;
comparing the program counter value identifying each fetched instruction to said program counter start value;
if said program counter value is equal to said program counter start value, changing the value of said buffer control signal to a second logical value indicating that the high-speed data buffer is to function as trace memory and
for each instruction in said sequence:
executing said instruction to generate a source address specifying a location of an operand value to be read from memory; and either:
storing said program counter value in said high-speed data buffer so that said high-speed data buffer functions as a trace memory; and
reading said operand value from the location in said external memory specified by said source address if said buffer control signal has said second logical value so that trace information is stored in said high-speed data buffer while the program is executed by the data processing system; or
reading said operand value from a location in said high-speed data buffer specified by said source address if said buffer control signal has said first logical value.

22. In a data processing system for executing instructions, with the data processing system coupled to an external memory, and with the data processing system including register locations for holding values, and a high-speed data buffer, a method for controlling said high-speed data buffer to function either as a data cache or as a trace memory, said method comprising the steps of:
setting a value of a buffer control signal, held in a first register location, to a first logical value indicating that the high-speed data buffer is to function as a data cache or a second logical value indicating that the high-speed data buffer is to function as a trace memory;
setting a value of trace control signal, held in a second register location, to a third logical value if only program counter values of instructions which change a program sequence, such as a jump or branch instruction, are to be traced or to a fourth logical value if all instructions are to be traced;
fetching a sequence of instructions to be executed, with each instruction in said sequence identified by a program counter value;
for fetched instructions that are not instructions that change program sequence;
executing said fetched instruction to generate a source address specifying a location of an operand value to be read from memory; and either
reading said operand value from said high-speed data buffer if said buffer control signal has said first logical value and/or said trace control signal has said third logical value; or
storing said program counter value in said high-speed data buffer so that said high-speed data buffer functions as a trace memory;
reading said operand value from the location in said external memory specified by said source address only if said buffer control signal has said second logical value and said trace control signal has said fourth logical value;
for fetched instructions that are instructions that change a program sequence;
executing the fetched instruction to change a program sequence; and storing said program counter value of the fetched instruction in said high-speed data buffer only if said buffer control signal is set to said second logical value.

23. In a data processing system for executing instructions, with the data processing system coupled to an external memory, and with the data processing system including register locations for holding values, and a high-speed data buffer, a method for controlling said high-speed data buffer to function either as an instruction cache or as a trace memory, said method comprising the steps of:

setting a value of a buffer control signal, held in a first register location, to a first logical value indicating that the high-speed data buffer is to function as an instruction cache or a second logical value indicating that the high-speed data buffer is to function as a trace memory;

fetching a first instruction to be executed identified by a first program counter value;

executing said first instruction to generate a second program counter value specifying a location of a second instruction to be read from memory;

if said buffer control signal has said second logical value:
storing said first program counter value in said high-speed data buffer so that said high-speed data buffer functions as a trace memory;
reading said second instruction from the location in said external memory specified by said second program counter value;

if said buffer control signal has said first logical value:
reading said second instruction from the location in said high-speed data buffer specified by said second program counter value.

* * * * *